United States Patent
Oyobe et al.

(10) Patent No.: US 7,891,451 B2
(45) Date of Patent: Feb. 22, 2011

(54) POWER CONTROLLER AND VEHICLE EQUIPPED WITH POWER CONTROLLER

(75) Inventors: Hichirosai Oyobe, Toyota (JP);
Tetsuhiro Ishikawa, Toyota (JP);
Yoshitoshi Watanabe, Nagoya (JP);
Katsuhiro Asano, Toyoake (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 307 days.

(21) Appl. No.: 12/226,916

(22) PCT Filed: May 24, 2007

(86) PCT No.: PCT/JP2007/061141

§ 371 (c)(1),
(2), (4) Date: Oct. 31, 2008

(87) PCT Pub. No.: WO2007/139202

PCT Pub. Date: Dec. 6, 2007

(65) Prior Publication Data

US 2009/0067205 A1   Mar. 12, 2009

(30) Foreign Application Priority Data

May 29, 2006  (JP) .............................. 2006-148791

(51) Int. Cl.
*B60W 10/24* (2006.01)
(52) U.S. Cl. .............................. 180/65.275; 180/65.285; 180/65.21; 180/65.265; 301/10.1
(58) Field of Classification Search .................. 307/9.1, 307/10.1; 180/65.1, 65.21, 65.265, 65.27, 180/65.275, 65.285
See application file for complete search history.

(56) References Cited

U.S. PATENT DOCUMENTS

| 5,099,186 | A |   | 3/1992 | Rippel et al. |
| 5,929,595 | A |   | 7/1999 | Lyons et al. |
| 6,137,704 | A |   | 10/2000 | Ito et al. |
| 7,265,455 | B2 | * | 9/2007 | Oyobe et al. ................ 290/1 R |
| 7,463,958 | B2 | * | 12/2008 | Suzuki ........................ 701/22 |
| 2002/0105300 | A1 |   | 8/2002 | Moriya et al. |
| 2006/0091836 | A1 |   | 5/2006 | Oyobe et al. |

(Continued)

FOREIGN PATENT DOCUMENTS

JP     A-4-295202     10/1992

(Continued)

OTHER PUBLICATIONS

Japanese Office Action issued in Japanese Patent Application No. 2006-148791 on Mar. 30, 2010 (with English translation).

*Primary Examiner*—J. Allen Shriver, II
*Assistant Examiner*—Erez Gurari
(74) *Attorney, Agent, or Firm*—Oliff & Berridge, PLC

(57) ABSTRACT

An ECU detects an effective value and phase of a voltage from a commercial power supply, based on a voltage from a voltage sensor. Further, ECU generates a command current, which is a command value of current caused to flow through power lines and in-phase with the voltage of the commercial power supply, based on the detected effective value and the phase and on a charge/discharge power command value for a power storage device. Then, ECU controls zero-phase voltage of inverters based on the generated command current.

22 Claims, 22 Drawing Sheets

U.S. PATENT DOCUMENTS

| | | | |
|---|---|---|---|
| 2007/0171689 A1 | 7/2007 | Ishikawa et al. | |
| 2008/0073135 A1 | 3/2008 | Oyobe et al. | |
| 2009/0277702 A1* | 11/2009 | Kanada et al. | 180/65.29 |

FOREIGN PATENT DOCUMENTS

| | | |
|---|---|---|
| JP | A-7-23535 | 1/1995 |
| JP | A-8-126121 | 5/1996 |
| JP | A-10-225014 | 8/1998 |
| JP | A-10-337047 | 12/1998 |
| JP | A-2002-218793 | 8/2002 |
| JP | A-2005-204361 | 7/2005 |
| JP | A-2005-318682 | 11/2005 |
| JP | A-2006-101594 | 4/2006 |
| JP | A-2006-101632 | 4/2006 |
| JP | A-2006-121844 | 5/2006 |
| JP | A-2006-136096 | 5/2006 |
| RU | 2 223 183 C2 | 8/2000 |

* cited by examiner

POWER CONTROLLER AND VEHICLE EQUIPPED WITH POWER CONTROLLER

TECHNICAL FIELD

The present invention relates to a power controller and a vehicle equipped with the controller and, particularly, it relates to a power controller exchanging electric power between a commercial power supply and a power storage device mounted on a vehicle, as well as to a vehicle equipped with the power controller.

BACKGROUND ART

Japanese Patent Laying-Open No. 4-295202 discloses a motor drive capable of exchanging electric power between an AC power supply outside a vehicle and a DC power supply provided in the vehicle. The motor drive includes a battery, inverters IA and IB, induction motors MA and MB, and a control unit. Induction motors MA and MB include Y-connected windings CA and CB, respectively. To neutral points NA and NB of windings CA and CB, an input/output port is connected through an EMI filter. Inverters IA and IB are provided corresponding to induction motors MA and MB, respectively, and connected to windings CA and CB, respectively. Inverters IA and IB are connected parallel to the battery.

In the motor drive, in a recharge mode, an AC electric power applied from a single phase power supply connected to the input/output port across neutral points NA and NB of windings CA and CB can be converted to a DC electric power to charge the battery. Further, it is possible to generate an AC electric power having sinusoidal adjusted wave across neutral points NA and NB, and to output the generated AC electric power to an external device connected to the input/output port.

In the motor drive disclosed in Japanese Patent Laying-Open No. 4-295202 described above, however, driving of induction motors MA and MB must be stopped in the recharge mode. Further, while the induction motors MA and MB are controlled for driving (in the driving mode), recharge mode control is impossible.

Further, though the laid-open application discloses battery charge with power factor of 1 from a single phase power supply to realize efficient charging of a battery, control with higher accuracy is necessary to realize more efficient battery charge or power feed to an external device.

DISCLOSURE OF THE INVENTION

The present invention was made to solve such a problem and its object is to provide a power controller for exchanging electric power with an AC power supply through neutral points of two AC motors, capable of exchanging electric power without interfering motor driving control, as well as to provide a vehicle provided with such a power controller.

Another object of the present invention is to provide a power controller for exchanging electric power with an AC power supply through neutral points of two AC motors, capable of exchanging electric power with higher efficiency, as well as to provide a vehicle provided with such a power controller.

The present invention provides a power controller capable of executing either one of charging of a power storage device mounted on a vehicle from an AC power supply outside of the vehicle and power feed from the power storage device to the AC power supply, including first and second AC rotating electric machines, first and second inverters, a pair of power lines, a first voltage detecting device, a command current generating unit, and an inverter control unit. The first AC rotating electric machine includes a star-connected first poly-phase winding as a stator winding. The second AC rotating electric machine includes a star-connected second poly-phase winding as a stator winding. The first inverter is connected to the first poly-phase winding and performs power conversion between the first AC rotating electric machine and the power storage device. The second inverter is connected to the second poly-phase winding and performs power conversion between the second AC rotating electric machine and the power storage device. The pair of power lines are connected to a first neutral point of the first poly-phase winding and a second neutral point of the second poly-phase winding, and configured to allow exchange of electric power between the AC power supply and the first and second neutral points. The first voltage detecting device detects a voltage of the AC power supply. The command current generating unit detects an effective value and phase of the AC power supply based on a detected voltage value from the first voltage detecting device, and based on the detected effective value and the phase and on a charge/discharge power command value for the power storage device, generates a command value of a current caused to flow to the pair of power lines having its phase adjusted with respect to the voltage of the AC power supply. The inverter control unit controls zero-phase voltage of at least one of the first and second inverters, based on the command current value generated by the command current generating unit.

Preferably, the command current generating unit generates a command current value of the same phase as the voltage of the AC power supply.

Preferably, the command current generating unit includes an effective value operating unit, a phase detecting unit, a sinusoidal wave generating unit, and an operating unit. The effective value operating unit operates an effective value of the voltage of the AC power supply based on the detected voltage value. The phase detecting unit detects phase of the voltage of the AC power supply based on the detected voltage value. The sinusoidal wave generating unit generates a sinusoidal wave phase-adjusted with respect to the phase detected by the phase detecting unit. The operating unit divides the charge/discharge power command value by the effective value, and multiplies the result of operation by the sinusoidal wave from the sinusoidal wave generating unit to generate the command current value.

More preferably, the sinusoidal wave generating unit generates a sinusoidal wave of the same phase as the phase detected by the phase detecting unit.

Preferably, the inverter control unit controls zero-phase voltage of either one of the first and second inverters based on the command current value, and holds the zero-phase voltage of the other one of the inverters at a fixed value.

More preferably, the inverter control unit turns off an upper arm and turns on a lower arm of arms of respective phases of the other inverter, when potential of a neutral point corresponding to the one inverter is higher than potential of a neutral point corresponding to the other inverter, and turns on the upper arm and turns off the lower arm, when the potential of the neutral point corresponding to the one inverter is lower than the potential of the neutral point corresponding to the other inverter.

Further, more preferably, the inverter control unit turns off the upper and lower arms of the arms of respective phases of the other inverter, when the power storage device is charged from the AC power supply.

More preferably, the inverter control unit periodically switches the first and second inverters as an inverter controlling the zero-phase voltage based on the command current value.

Further, more preferably, the inverter control unit controls the zero-phase voltage of the first and second inverters based on the command current value such that the zero-phase voltage of the second inverter attains to zero-phase voltage of the first inverter with its sign inverted.

More preferably, the inverter control unit generates a first driving signal for controlling switching of the first inverter dependent on a relation of magnitude between a prescribed carrier wave and a first signal wave generated based on the command current value, and generates a second driving signal for controlling switching of the second inverter dependent on a relation of magnitude between the carrier wave and a second signal wave obtained by inverting sign of the first signal wave.

Further, more preferably, the inverter control unit generates a first driving signal for controlling switching of the first inverter dependent on a relation of magnitude between a prescribed first carrier wave and a signal wave generated based on the command current value, and generates a second driving signal for controlling switching of the second inverter dependent on a relation of magnitude between a second carrier wave obtained by inverting sign of the first carrier wave and the signal wave.

Further, more preferably, the inverter control unit generates a first driving signal for controlling switching of the first inverter dependent on a relation of magnitude between a prescribed carrier wave and a signal wave generated based on the command current value, and generates a second driving signal that changes complementary to the first driving signal, for controlling switching of the second inverter.

Preferably, the power controller further includes a first current detecting device. The first current detecting device detects a current flowing through the pair of power lines. The inverter control unit includes a current control unit and a driving signal generating unit. The current control unit generates a zero-phase command voltage of the first and second inverters based on a deviation between a detected current value from the first current detecting device and the command current value. The driving signal generating unit generates a driving signal for driving the first and second inverters based on the generated zero-phase command voltage.

Preferably, the power controller further includes a plurality of second current detecting devices. The plurality of second current detecting devices detect current flowing through respective phases of each of the first and second AC rotating electric machines. The inverter control unit includes a plurality of current control units and a driving signal generating unit. The plurality of current control units are provided corresponding to respective phases of each of the first and second AC rotating electrical machines, and generate a command voltage of the corresponding phase of the corresponding inverter, based on a deviation between a detected current value of the corresponding second current detecting device and the command current value of each phase obtained by uniformly distributing the command current value to respective phases. The driving signal generating unit generates a driving signal for driving the first and second inverters based on the generated command voltage of each phase.

Preferably, the current control unit or each of the plurality of current control units includes an internal model compensating unit. The internal model compensating unit calculates a control compensation amount using a sinusoidal wave function corresponding to the command current value.

More preferably, the internal model compensating unit includes first and second mean value operating units, and an operating unit. The first mean value operating unit calculates a mean value of magnitude of the command current value or the command current value of each phase. The second mean value operating unit calculates a mean value of magnitude of the detected current value. The operating unit multiplies a deviation between an output from the first mean value operating unit and an output from the second mean value operating unit by a gain, and further multiplies the result of operation by a sinusoidal function of the same phase as the AC power supply to provide the control compensation amount.

Further, preferably, the current control unit or each of the plurality of current control units includes a repetition control unit. The repetition control unit successively calculates, for each phase of the AC power supply, the zero-phase command voltage or the command voltage for each phase, based on the deviation of last period of the AC power supply.

Preferably, the power controller further includes a second voltage detecting device. The second voltage detecting device detects a DC voltage applied to the first and second inverters. The command current generating unit includes a voltage control unit. The voltage control unit corrects, based on a deviation between a detected voltage value from the second voltage detecting device and a target voltage of the DC voltage, the charge/discharge power command value such that the DC voltage is adjusted to the target value.

Further, preferably, the power controller further includes a boost converter, a second voltage detecting device, and a converter control unit. The boost converter is provided between the power storage device and the first and second inverters. The second voltage detecting device detects a DC voltage applied to the first and second inverters. The converter control unit controls the boost converter such that the DC voltage is adjusted to a target voltage, based on a detected voltage value from the second voltage detecting device.

More preferably, the power controller further includes a third current detecting device. The third current detecting device detects a current input to/output from the power storage device. The converter control unit includes a voltage control unit and a current control unit. The voltage control unit is configured to adjust the DC voltage to the target voltage, based on a detected voltage value from the second voltage detecting device. The current control unit is configured to adjust a current input to/output from the power storage device to a target current, based on a detected current value from the third current detecting device.

More preferably, the converter control unit stops the boost converter when a deviation between the detected current value and the target current exceeds a threshold value.

Further, according to the present invention, the vehicle includes a wheel receiving driving torque from at least one of first and second AC rotating electric machines and any of the above-described power controllers.

In the present invention, electric power is exchanged through a pair of power lines connected to first and second neutral points, between the AC power supply and the power storage device. The commend current generating unit generates a command value of a current caused to flow to the pair of power lines having its phase adjusted with respect to the voltage of the AC power supply, based on the effective value and phase of the voltage of AC power supply detected based on a voltage detection value from the first voltage detecting device and on the charge/discharge power command value for the power storage device. Specifically, the command current generating unit generates the command current value not based on the detected voltage waveform of the AC power supply that may involve harmonics or fluctuation component, but by detecting the phase and effective value of the voltage of AC power supply and using the sinusoidal waveform only of the fundamental wave. Therefore, a command current value free of any harmonic component or fluctuation component of AC power supply and allowing charging or power feed with power factor of 1 with respect to the AC power supply can be generated. The inverter control unit controls the first and second inverters based on the thus generated command current value and, therefore, generation of ineffective electric power or harmonic current due to the harmonic component or fluctuation component can be prevented.

Therefore, the present invention realizes efficient charging of a power storage device from the AC power supply and feeding of power from the power storage device to the AC power supply. Further, even when the voltage level of the AC power supply is switched, it is possible to ensure electric power that corresponds to the set command value of charging/discharging electric power. Specifically, constant charging power and constant feeding power can be attained without necessitating change in system or setting in different countries with different voltage levels of commercial power supply. Further, the loss and generation of ineffective electric power due to harmonics and fluctuation component can be prevented, and therefore, a highly efficient and small size device can be realized.

Further, the inverter control unit controls zero-phase voltage of at least one of the first and second inverters based on the command current value, and therefore, the control has no influence on the torque of first and second AC rotating electrical machines. Therefore, according to the present invention, power control of AC power supply is possible without interfering torque control of the first and second AC rotating electrical machines. Specifically, it is possible to charge the power storage device from the AC power supply and to feed power from the power storage device to the AC power supply, while the first and second AC rotating electrical machines are being driven.

Further, according to the present invention, for charging the power storage device from the AC power supply and for feeding power from the power storage device to the AC power supply, poly-phase windings of the first and second AC rotating electrical machines and the first and second inverters are used. Therefore, it is unnecessary to provide a dedicated power converter for power conversion between the AC power supply and the power storage device. Accordingly, the present invention reduces the number of additional components.

BEST MODES FOR CARRYING OUT THE INVENTION

Figure 1:
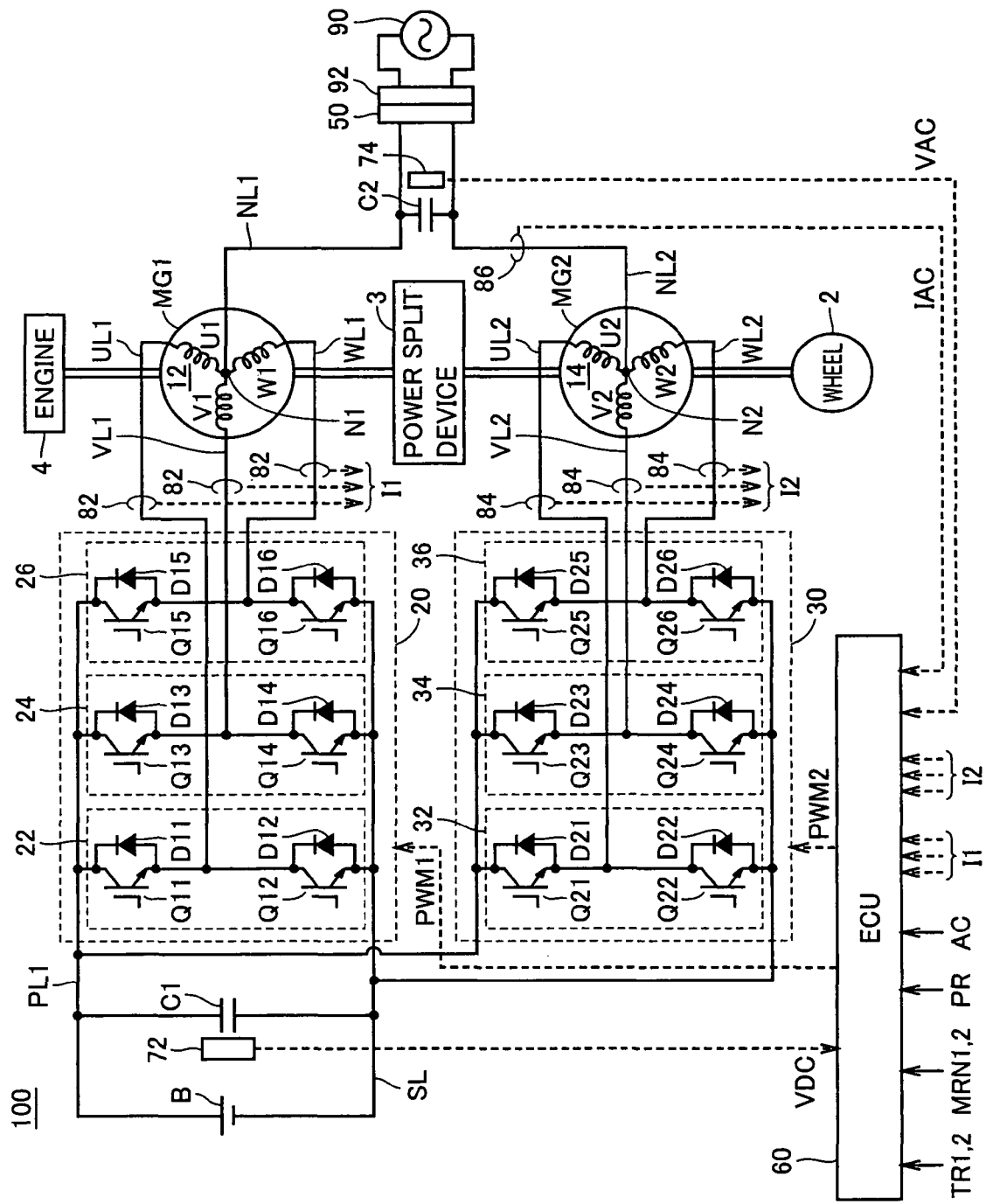
FIG. 1 is an overall block diagram of a hybrid vehicle shown as an example of the vehicle in accordance with Embodiment 1 of the present invention.

In the following, embodiments of the present invention will be described in detail with reference to the figures. Throughout the figures, the same or corresponding portions are denoted by the same reference characters and description thereof will not be repeated.

Embodiment 1

FIG. 1 is an overall block diagram of the hybrid vehicle shown as an example of the vehicle in accordance with Embodiment 1 of the present invention. Referring to FIG. 1, a hybrid vehicle 100 includes an engine 4, motor generators MG1 and MG2, a power split device 3, and wheels 2. Hybrid vehicle 100 further includes a power storage device B, inverters 20 and 30, and an ECU (Electronic Control Unit) 60.

Hybrid vehicle 100 further includes a capacitor C1, a power line PL1, a ground line SL, U-phase lines UL1 and UL2, V-phase lines VL1 and VL2, W-phase lines WL1 and WL2, a voltage sensor 72, and current sensors 82 and 84. Hybrid vehicle 100 further includes power lines NL1 and NL2, a connector 50, a capacitor C2, a voltage sensor 74, and a current sensor 86.

Hybrid vehicle 100 runs using engine 4 and motor generator MG2 as power sources. Power split device 3 is coupled to engine 4 and to motor generators MG1 and MG2, and distributes power among these. By way of example, a planetary gear mechanism having three rotation shafts of a sun gear, a planetary carrier and a ring gear may be used as the power split device 3. These three shafts of rotation are respectively connected to respective rotation shafts of engine 4 and motor generators MG1 and MG2. For instance, it is possible to mechanically connect engine 4 and motor generators MG1 and MG2 to power split device 3 by making the rotor of motor generator MG1 hollow and passing a crankshaft of engine 4 through the center thereof.

Rotation shaft of motor generator MG2 is coupled to wheel 2 by a reduction gear or a differential gear, not shown. Further, a reduction mechanism for the rotation shaft of motor generator MG2 may further be incorporated inside the power split device 3.

Motor generator MG1 is incorporated in the hybrid vehicle 100, operating as a generator driven by the engine 4 and as a motor that can start the operation of engine 4. Motor generator MG2 is incorporated in the hybrid vehicle 100 as a motor driving wheel 2.

Positive electrode and negative electrode of power storage device B are connected to power line PL1 and ground line SL, respectively. Capacitor C1 is connected between power line PL1 and ground line SL. Inverter 20 includes a U-phase arm 22, a V-phase arm 24 and a W-phase arm 26. U-phase arm 22, V-phase arm 24 and W-phase arm 26 are connected in parallel between power line PL1 and ground line SL. U-phase arm 22 includes series-connected npn transistors Q11 and Q12, V-phase arm 24 includes series-connected npn transistors Q13 and Q14, and W-phase arm 26 includes series-connected npn transistors Q15 and Q16. Between the collector and emitter of npn transistors Q11 to Q16, diodes D11 to D16 are connected, respectively, to cause current flow from the emitter side to the collector side.

As the above-described npn transistors and other npn transistors that will be described later in the specification, an IGBT (Insulated Gate Bipolar Transistor) may be used. Further, in place of the npn transistor, a power switching element such as a power MOSFET (Metal Oxide Semiconductor Field-Effect Transistor) may be used.

Motor generator MG1 includes a three-phase coil 12 as a stator coil. U-phase coil U1, V-phase coil V1 and W-phase coil W1 forming the three-phase coil have one end connected together to form a neutral point N1, and U-phase coil U1, V-phase coil V1 and W-phase coil W1 have the other end connected to nodes between upper and lower arms of npn transistors of U-phase arm 22, V-phase arm 24 and W-phase arm 26 of inverter 20, respectively.

Inverter 30 includes a U-phase arm 32, a V-phase arm 34 and a W-phase arm 36. Motor generator MG2 includes a three-phase coil 14 as a stator coil. Inverter 30 and motor generator MG2 have the same structures as inverter 20 and motor generator MG1, respectively.

Power line NL1 has one end connected to neutral point N1 of three-phase coil 12 and the other end connected to connector 50. Power line NL2 has one end connected to neutral point N2 of three-phase coil 14 and the other end connected to connector 50. Capacitor C2 is connected between power lines NL1 and NL2.

Power storage device B is a rechargeable DC power source, such as a nickel hydride or lithium ion secondary battery. Power storage device B outputs a DC power to capacitor C1, and is charged by inverter 20 and/or 30. It is noted that a large capacity capacitor may be used as power storage device B.

Capacitor C1 smoothes voltage fluctuation between power line PL1 and ground line SL. Voltage sensor 72 detects voltage between terminals of capacitor C1, that is, voltage VDC of power line PL1 to ground line SL, and outputs the detected voltage VDC to ECU 60.

In accordance with a signal PWM1 from ECU 60, inverter 20 converts the DC voltage received from capacitor C1 to a three-phase AC voltage, and outputs the converted three-phase AC voltage to motor generator MG1. Further, inverter 20 converts three-phase AC voltage generated by motor generator MG1 receiving power from engine 4 to a DC voltage in accordance with the signal PWM1 from ECU 60, and outputs the converted DC voltage to power line PL1.

In accordance with a signal PWM2 from ECU 60, inverter 30 converts the DC voltage received from capacitor C1 to a three-phase AC voltage, and outputs the converted three-phase AC voltage to motor generator MG2. Further, inverter 30 converts three-phase AC voltage generated by motor generator MG2 receiving rotational force of wheel 2 at the time of regenerative braking of the vehicle to a DC voltage in accordance with the signal PWM2 from ECU 60, and outputs the converted DC voltage to power line PL1.

Here, when AC power is input from commercial power supply 90 connected to connector 50 by connector 92, inverters 20 and 30 convert the AC power applied from commercial power supply 90 through power lines NL1 and NL2 to neutral points N1 and N2 to DC power and output the power to power line PL1 by a method that will be described later, to charge power storage device B. When power feed from power storage device B to commercial power supply 90 is requested, inverters 20 and 30 convert the DC power from power storage device B to AC power, and output the same from neutral points N1 and N2 through power lines NL1 and NL2, to commercial power supply 90.

Capacitor C2 removes influence of ripple to commercial power supply 90 connected to connector 50. Voltage sensor 74 detects a voltage VAC across power lines NL1 and NL2, and outputs the detected voltage VAC to ECU 60. Current sensor 86 detects a current IAC flowing through power line NL2 and outputs the detected current IAC to ECU 60. It is noted that current flowing through power line NL1 may be detected by current sensor 86.

Each of motor generators MG1 and MG2 is a three-phase AC rotating electric machine, implemented, for example, by three-phase AC synchronous motor generator. Motor generator MG1 is driven for regeneration by inverter 20, and outputs three-phase AC voltage generated using the power of engine 4 to inverter 20. Further, motor generator MG1 is driven for power running by inverter 20 at the start of engine 4, attaining cranking of engine 4. Motor generator MG2 is driven for power running by inverter 30, and generates power for driving wheel 2. Further, at the time of regenerative braking of the vehicle, motor generator MG2 is driven for regeneration by inverter 30, and outputs three-phase AC voltage generated by using rotational power received from wheel 2 to inverter 30.

Current sensor 82 detects motor current I1 flowing through coils of respective phases of motor generator MG1, and outputs the detected motor current I1 to ECU 60. Current sensor 84 detects motor current I2 flowing through coils of respective phases of motor generator MG2, and outputs the detected motor current I2 to ECU 60.

ECU 60 generates signals PWM1 and PWM2 for driving inverters 20 and 30, respectively, and outputs the generated signals PWM1 and PWM2 to inverters 20 and 30, respectively.

When connector 92 of commercial power supply 90 is connected to connector 50 and charging of power storage device B from commercial power supply 90 is requested based on a signal AC, ECU 60 controls inverters 20 and 30 such that the AC power applied from commercial power supply 90 to neutral points N1 and N2 is converted to DC power for charging power storage device B, in a manner as will be described later.

When connector 92 of commercial power supply 90 is connected to connector 50 and power feed from power storage device B to commercial power supply 90 is requested based on the signal AC, ECU 60 controls inverters 20 and 30 such that the DC power from power storage device B is converted to AC power and output from neutral points N1 and N2 to commercial power supply 90, in a manner as will be described later.

The signal AC is a signal requesting charging of power storage device B from commercial power supply 90 or power feed from power storage device B to commercial power supply 90, and when a user operates, for example, an input device (not shown, same in the following) for instructing charging of power storage device B or power feed to commercial power supply 90, the signal changes according to the request.

Figure 2:
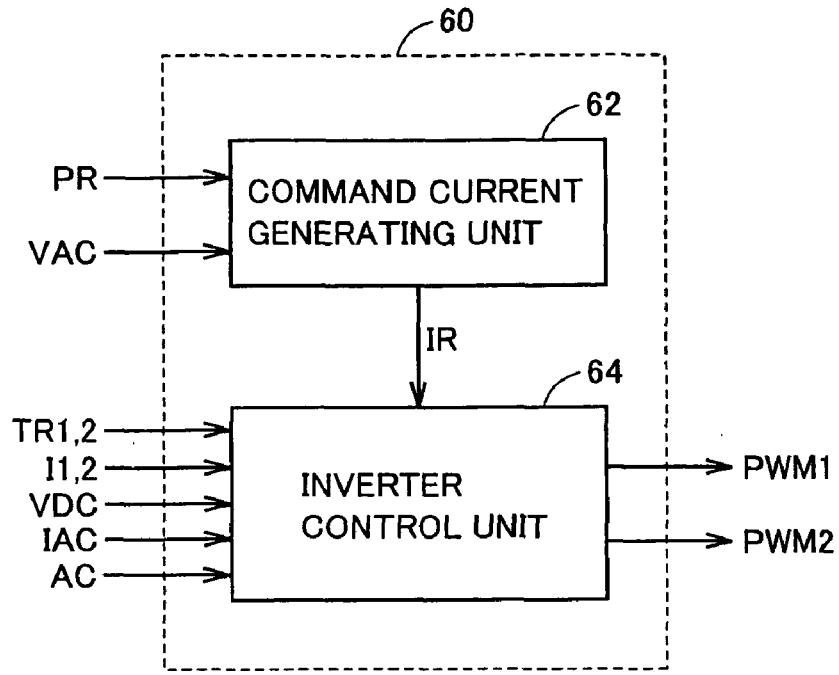
FIG. 2 is a functional block diagram of ECU shown in FIG. 1.

FIG. 2 is a functional block diagram of ECU 60 shown in FIG. 1. Referring to FIG. 2, ECU 60 includes a command current generating unit 62, and an inverter control unit 64. Command current generating unit 62 generates a command current IR for feeding power to commercial power supply 90, or charging power storage device B with power factor of 1 with respect to commercial power supply 90, based on a charge/discharge power command value PR received from the vehicle ECU (not shown, same in the following) and based on the voltage VAC from voltage sensor 74. Here, the charge/discharge power command value PR may indicate the power command value for charging power storage device B when power storage device B is charged from commercial power supply 90 and the power command value for discharging power storage device B when power is fed from power storage device B to commercial power supply 90.

Based on torque control values TR1 and TR2 of motor generators MG1 and MG2 received from vehicle ECU, motor currents I1 and I2 from current sensors 82 and 84, voltage VDC from voltage sensor 72, current IA from current sensor 86, signal AC and command current IR from command current generating unit 62, inverter control unit 64 generates a signal PWM1 for turning on/off npn transistors Q11 to Q16 of inverter 20 and a signal PWM2 for turning on/off npn transistors Q21 to Q26 of inverter 30, and outputs the generated signals PWM1 and PWM2 to inverters 20 and 30, respectively.

Figure 3:
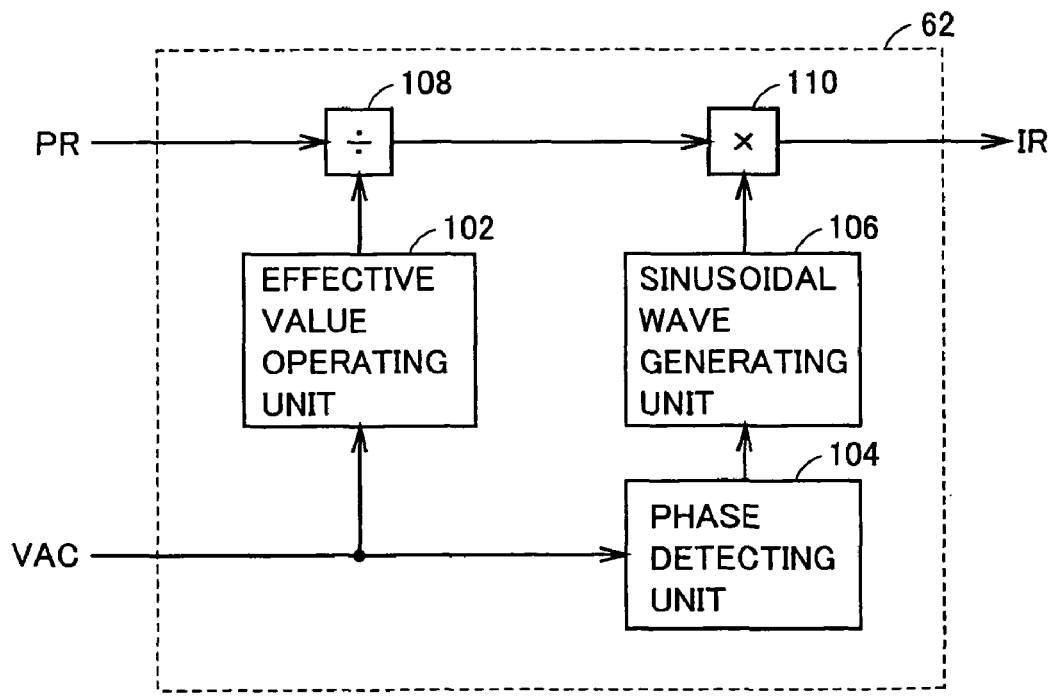
FIG. 3 is a detailed functional block diagram of a command current generating unit shown in FIG. 2.

FIG. 3 is a detailed functional block diagram of command current generating unit 62 shown in FIG. 2. Referring to FIG. 3, command current generating unit 62 includes an effective value operating unit 102, a phase detecting unit 104, a sinusoidal wave generating unit 106, a dividing unit 108 and a multiplying unit 110. Effective value operating unit 102 detects peak voltage of voltage VAC, and based on the detected peak voltage, calculates an effective value of voltage VAC. Phase detecting unit 104 detects a zero-cross point of voltage VAC, and based on the detected zero-cross point, detects the phase of voltage VAC.

Sinusoidal wave generating unit 106 generates a sinusoidal wave of the same phase as voltage VAC, based on the phase of voltage VAC detected by phase detecting unit 104. By way of example, sinusoidal wave generating unit 106 can generate a sinusoidal wave of the same phase as voltage VAC, based on the phase from phase detecting unit 104, using a table of sinusoidal function.

Dividing unit 108 divides the charge/discharge power command value PR by the effective value of voltage VAC from effective value operating unit 102, and outputs the result of division to multiplying unit 110. Multiplying unit 110 multiplies the result of operation of dividing unit 108 by the sinusoidal wave from sinusoidal wave generating unit 106, and outputs the result of operation as command current IR.

The command current IR generated in this manner does not involve any harmonics component or fluctuation component of commercial power supply 90. Therefore, when inverters 20 and 30 are controlled based on the command current IR, ineffective electric power or harmonics current corresponding to the harmonics component and fluctuation component of commercial power supply 90 are not generated. Further, command current IR is in phase with commercial power supply 90, and the power factor is 1 with respect to the voltage of commercial power supply 90. This enables efficient charging of power storage device B from commercial power supply 90 or efficient power feed from power storage device B to commercial power supply 90.

It is also possible to add the function of compensating for ineffective power, for controlling ineffective power by adjusting the phase of sinusoidal wave generated based on the phase of voltage VAC with respect to the voltage VAC.

Figure 4:
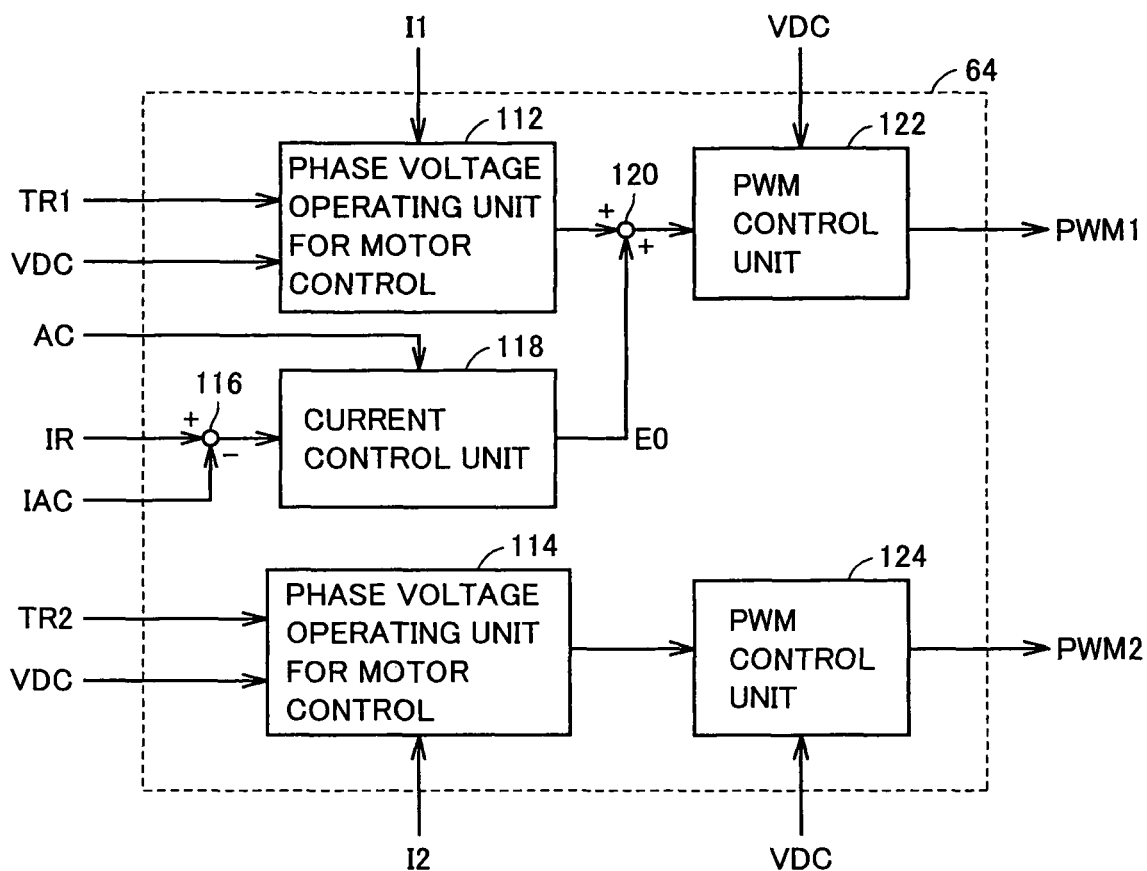
FIG. 4 is a detailed functional block diagram of an inverter control unit shown in FIG. 2.

FIG. 4 is a detailed functional block diagram of inverter control unit 64 shown in FIG. 2. Referring to FIG. 4, inverter control unit 64 includes phase-voltage operating units 112 and 114 for motor control, a subtracting unit 116, a current control unit 118, an adding unit 120, and PWM control units 122 and 124. Phase voltage operating unit 112 for motor control calculates a command voltage to be applied to coil of each phase of motor generator MG1 based on torque control value TR1 and motor current I1 of motor generator MG1 and on voltage VDC, and outputs the calculated command voltage for each phase to adding unit 120.

Subtracting unit 116 subtracts current IAC from command current IR received from command current generating unit 62, and outputs the result of operation to current control unit 118. When the signal AC is active, current control unit 118 generates a zero-phase command voltage E0 for causing current IAC to follow command current IR based on deviation between command current IR and current IAC, and outputs the generated zero-phase command voltage E0 to adding unit 120. In current control unit 118, by way of example, proportional-integral control (PI control) takes place. When the signal AC is inactive, current control unit 118 is inactivated, and zero-phase command voltage of 0 is output.

Adding unit 120 adds the command voltage for each phase from phase-current operating unit 112 for motor control to zero-phase command voltage E0 from current control unit 118, and outputs the result of operation to PWM control unit 122. PWM control unit 122 generates the signal PWM1 for actually turning on/off each of npn transistors Q11 to Q16 of inverter 20, and outputs the generated signal PWM1 to each of the npn transistors Q11 to Q16 of inverter 20.

The zero-phase command voltage E0 from current control unit 118 is added to command voltage of each phase and, therefore, the zero-phase command voltage E0 itself does not contribute to the rotation torque of motor generator MG1. Therefore, charging of power storage device B from commercial power supply 90 or power feed from power storage device B to commercial power supply 90 can be controlled without interfering torque control of motor generator MG1 based on the command voltage of each phase from phase voltage operating unit 112 for motor control.

Phase voltage operating unit 114 for motor control calculates the command voltage to be applied to the coil of each phase of motor generator MG2 based on the torque control value TR2 and motor current I2 of motor generator MG2 and on voltage VDC, and outputs the calculated command voltage for each phase to PWM control unit 124.

Based on the command voltage for each phase from phase voltage operating unit 114 for motor control, PWM control unit 124 generates the signal PWM2 for actually turning on/off each of npn transistors Q21 to Q26 of inverter 30, and outputs the generated signal PWM2 to each of the npn transistors Q21 to Q26 of inverter 30.

In the foregoing, zero-phase command voltage E0 is added to the command voltage of each phase from phase voltage operating unit 112 for motor control, and therefore, the potential of neutral point N1 of three-phase coil 12 corresponding to inverter 20 fluctuates in correspondence to zero-phase command voltage E0.

In the foregoing, the zero-phase command voltage E0 may be added to the command voltage of each phase from phase voltage operating unit 114 for motor control. In that case, the potential of neutral point N2 of three-phase coil 14 corresponding to inverter 30 fluctuates in correspondence with zero-phase command voltage E0. In this case either, the zero-phase command voltage E0 does not contribute to the rotation torque of motor generator MG2. Therefore, charging of power storage device B from commercial power supply 90 or power feed from power storage device B to commercial power supply 90 can be controlled without interfering torque control of motor generator MG2 based on the command voltage of each phase from phase voltage operating unit 114 for motor control.

Figure 5:
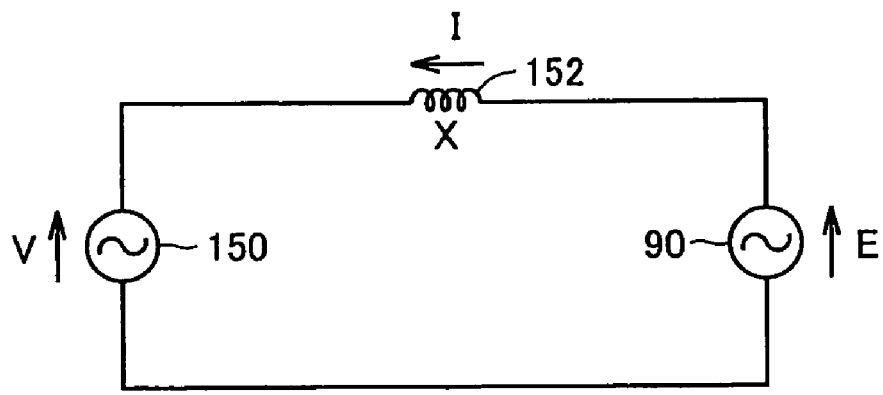
FIG. 5 is a zero-phase equivalent circuit diagram of the inverter and motor generator shown in FIG. 1.

FIG. 5 is a zero-phase equivalent circuit diagram of inverters 20 and 30 and motor generators MG1 and MG2 shown in FIG. 1. Power supply 150 is formed by inverters 20 and 30, and voltage V represents a voltage across neutral points N1 and N2. Voltage E represents a voltage of commercial power supply 90. Further, impedance 152 represents a sum of leakage impedance of motor generators MG1 and MG2 and impedance on the side of commercial power supply 90, of which magnitude is X. Current I represents a current flowing between inverters 20 or 30 and commercial power supply 90, which corresponds to current IAC described above.

Figure 6:
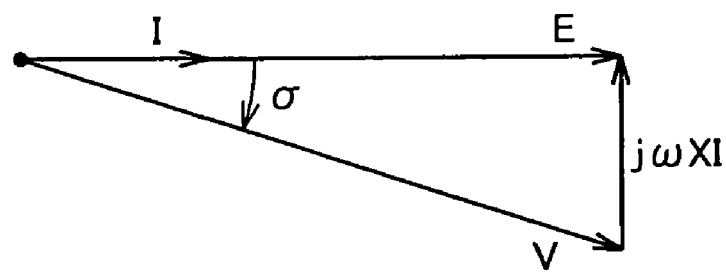
FIG. 6 is a phasor diagram realizing power factor of 1 when the power storage device is charged from commercial power supply, in the zero-phase equivalent circuit of FIG. 5.

FIG. 6 is a phasor diagram realizing power factor of 1 at the time of charging power storage device B from commercial power supply 90, in the zero-phase equivalent circuit shown in FIG. 5. Referring to FIG. 6, vector E represents voltage phasor of commercial power supply 90. Vector I represents current phasor flowing between inverter 20 or 30 and commercial power supply 90. Vector jωXI represents voltage phasor derived from impedance 152. Vector V represents voltage phasor across neutral points N1 and N2.

By regulating the voltage V across neutral points N1 and N2 to have lagged phase from the voltage E of commercial power supply 90, a charging operation to obtain power from commercial power supply 90 is realized. Based on the phasor relation as shown, by regulating the voltage V across neutral points N1 and N2 to have the phase lagged by phase σ from the voltage E of commercial power supply 90, charging with power factor of 1 from commercial power supply 90 becomes possible.

Figure 7:
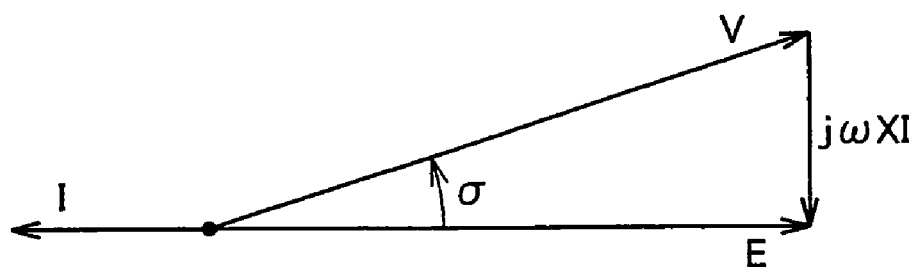
FIG. 7 is a phasor diagram realizing power factor of 1 when the power is fed from the power storage device to the commercial power supply, in the zero-phase equivalent circuit of FIG. 5.

FIG. 7 is a phasor diagram realizing power factor of 1 at the time of power feed from power storage device B to commercial power supply 90, in the zero-phase equivalent circuit shown in FIG. 5. Referring to FIG. 7, by regulating the voltage V across neutral points N1 and N2 to have advanced phase from the voltage E of commercial power supply 90, a power feed operation to output electric power to commercial power supply 90 is realized. Based on the phasor relation as shown, by regulating the voltage V across neutral points N1 and N2 to have the phase advanced by phase σ from the voltage E of commercial power supply 90, power feed with power factor of 1 to commercial power supply 90 becomes possible.

Next, flow of current at the time of charging from commercial power supply 90 to power storage device B and at the time of power feed from power storage device B to commercial power supply 90 will be described.

Figure 8:
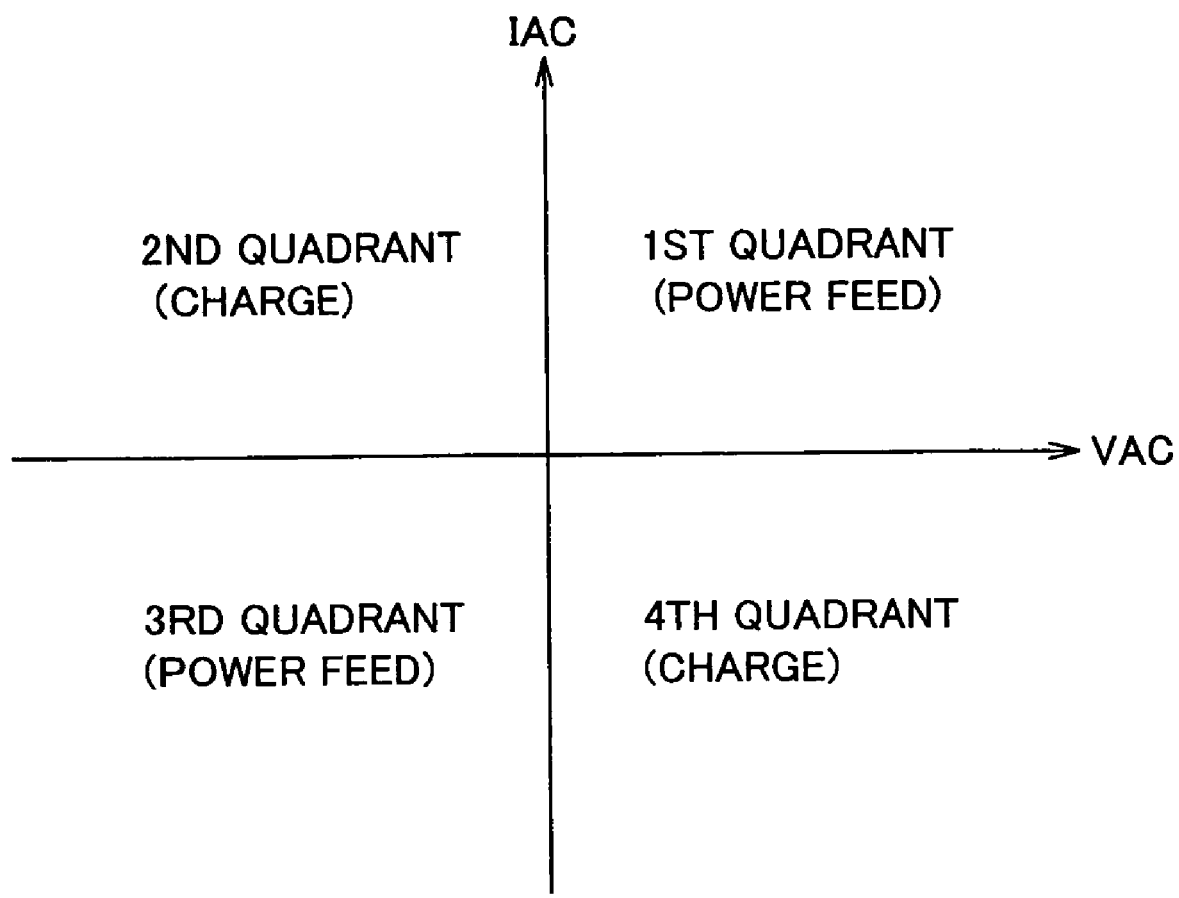
FIG. 8 shows directions of voltage of commercial power supply and current flowing through power lines as well as relation between charging of the power storage device from the commercial power supply and power feed of commercial power supply from the power storage device.

FIG. 8 shows directions of voltage VAC of commercial power supply 90 and current IAC flowing through power lines NL1 and NL2 as well as relation between charging from commercial power supply 90 to power storage device B and power feed from power storage device B to commercial power supply 90. Referring to FIG. 8, when the potential of power line NL1 is higher than the potential of power line NL2, the voltage VAC is considered to be positive. Further, when current flows from neutral point N1 to power line N1 (when current flows from power line NL2 to neutral point N2), current IAC is considered to be positive.

When voltage VAC and current IAC are both positive, power is being supplied to commercial power supply 90 (power feed), which state will be hereinafter referred to as a "first quadrant." When voltage VAC is negative and current IAC is positive, power is obtained from commercial power supply 90 (charging), which state will be hereinafter referred to as a "second quadrant."

Further, when voltage VAC and current IAC are both negative, power is being supplied to commercial power supply 90 (power feed), which state will be hereinafter referred to as a "third quadrant." When voltage VAC is positive and current IAC is negative, power is obtained from commercial power supply 90 (charging), which state will be hereinafter referred to as a "fourth quadrant."

FIGS. 9 to 12 show current flow when power storage device B is charged from commercial power supply 90. FIGS. 9 to 12 and FIGS. 13 and 14 showing the current flow when power is fed from power storage device B to commercial power supply 90, which will be described later, show zero-phase equivalent circuit of inverters 20 and 30 and motor generators MG1 and MG2 of FIG. 1. In the zero-phase equivalent circuit, in each of inverters 20 and 30, three transistors of the upper arm can be regarded as in the same switching state (all on or all off), and three transistors of the lower arm can also be regarded as in the same switching state. Therefore, in FIGS. 9 to 14, npn transistors Q11, Q13 and Q15 of inverter 20 are collectively represented by an upper arm 20A, and npn transistors Q12, Q14 and Q16 of inverter 20 are collectively represented as lower arm 20B. Further, npn transistors Q21, Q23 and Q25 are collectively represented as upper arm 30A, and npn transistors Q22, Q24 and Q26 are collectively represented as lower arm 30B.

Figure 9:
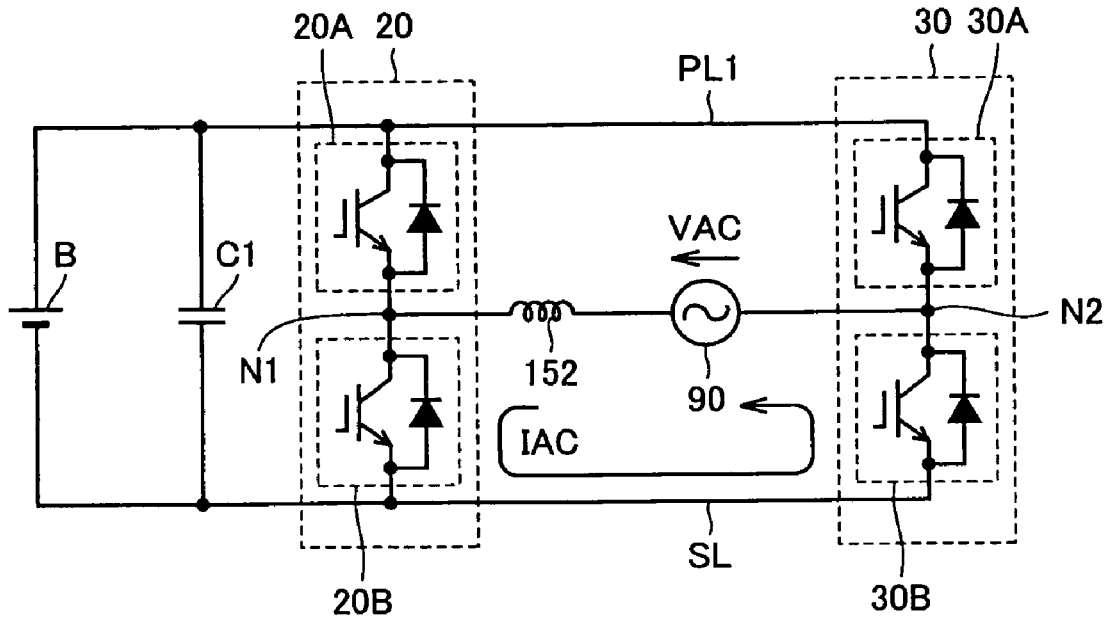
FIG. 9 is a first diagram representing current flow when the power storage device is charged from the commercial power supply.
Figure 10:
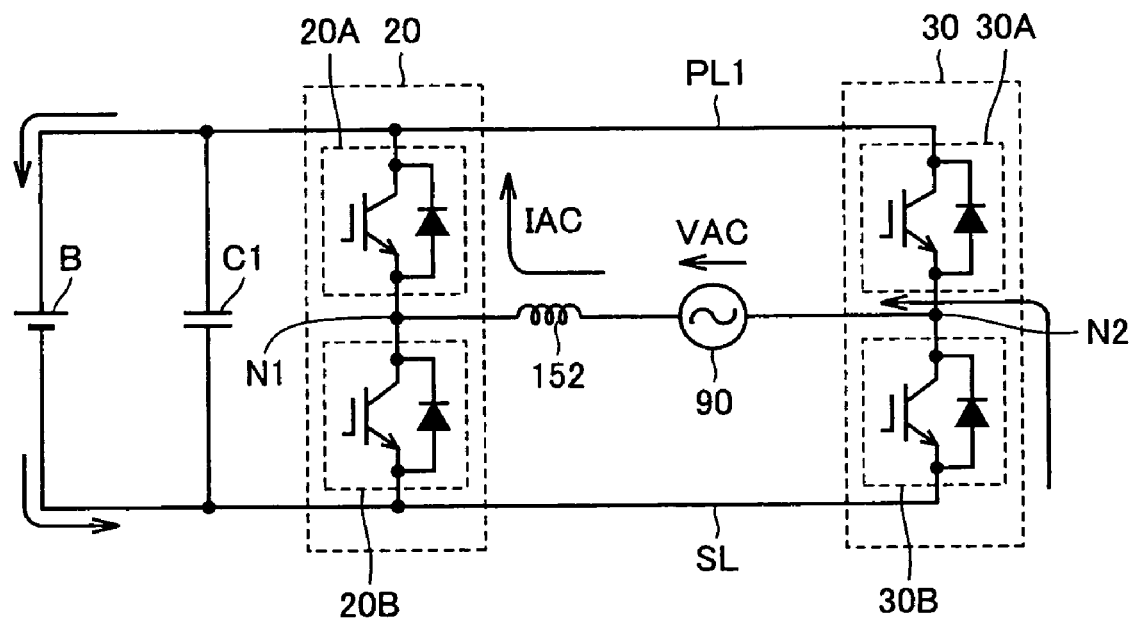
FIG. 10 is a second diagram representing current flow when the power storage device is charged from the commercial power supply.

FIGS. 9 and 10 show the current flow in the fourth quadrant of FIG. 8. Referring to FIG. 9, in Embodiment 1, PWM operation of inverter 20 is performed based on the zero-phase command voltage E0 as shown in FIG. 4 and inverter 30 does not receive zero-phase command voltage E0. Therefore, in the zero phase equivalent circuit, inverter 30 is normally in the off state.

When upper arm 20A of inverter 20 is turned off and the lower arm 20B is turned on, a current flows from commercial power supply 90 through neutral point N1, lower arm 20B, ground line SL, lower arm 30B of inverter 30 and neutral point N2.

Referring to FIG. 10, when lower arm 20B of inverter 20 is turned off and upper arm 20A is turned on, energy stored in impedance 152 (leakage inductance of motor generators MG1 and MG2) is discharged, and a current flows through upper arm 20A to power storage device B.

Figure 11:
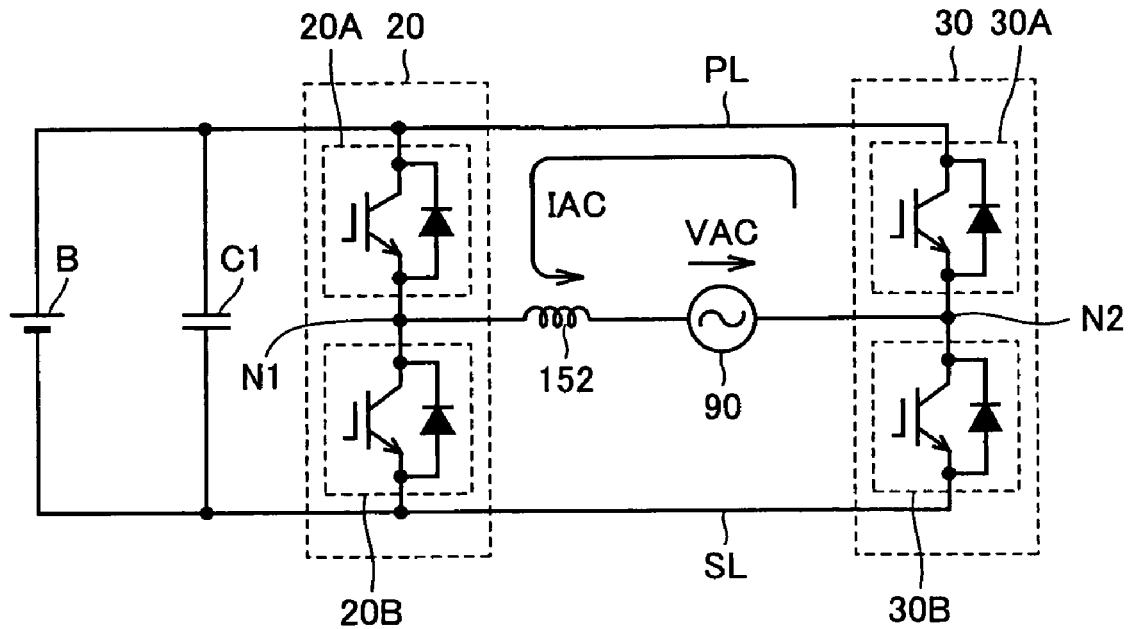
FIG. 11 is a third diagram representing current flow when the power storage device is charged from the commercial power supply.
Figure 12:
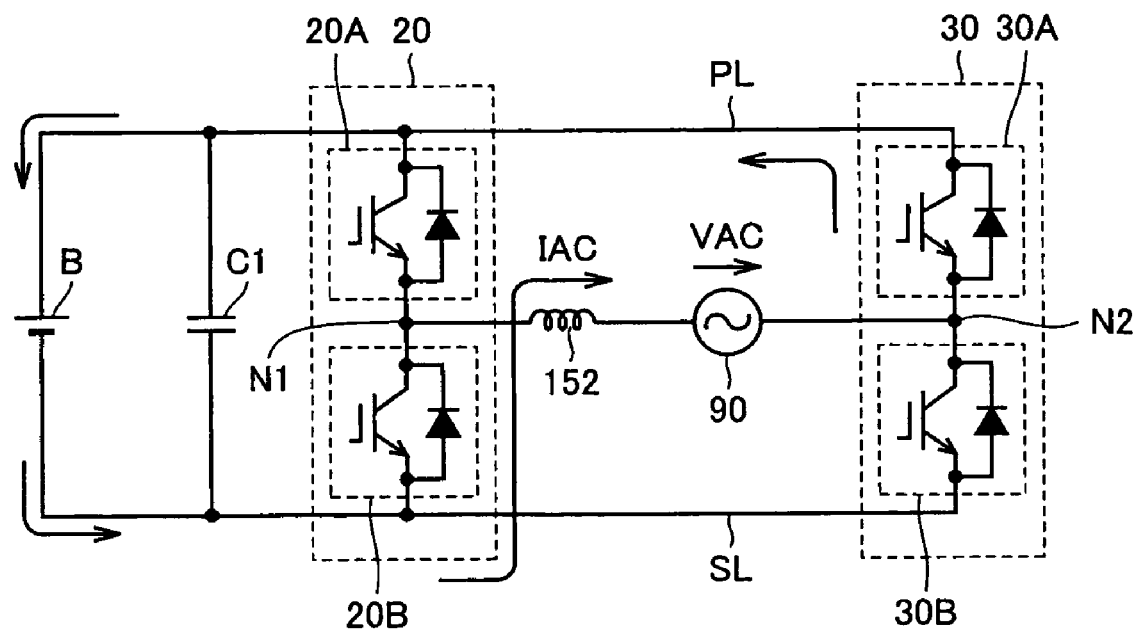
FIG. 12 is a fourth diagram representing current flow when the power storage device is charged from the commercial power supply.

FIGS. 11 and 12 show the current flow in the second quadrant of FIG. 8. Referring to FIG. 11, when upper arm 20A of inverter 20 is turned on and lower arm 20B is turned off, a current flows from commercial power supply 90 through neutral point N2, upper arm 30A of inverter 30, power line PL1, upper arm 20A and neutral point N1.

Referring to FIG. 12, when upper arm 20A of inverter 20 is turned off and lower arm 20B is turned on, the energy stored in impedance 152 is discharged, and a current flows through upper arm 30A of inverter 30 to power storage device B.

In the foregoing, inverter 30 not receiving zero-phase command voltage E0 is kept normally off. In the fourth quadrant, however, lower arm 30B may be turned on (upper arm 30A is off), and in the second quadrant, upper arm 30A may be turned on (lower arm 30B is off).

Figure 13:
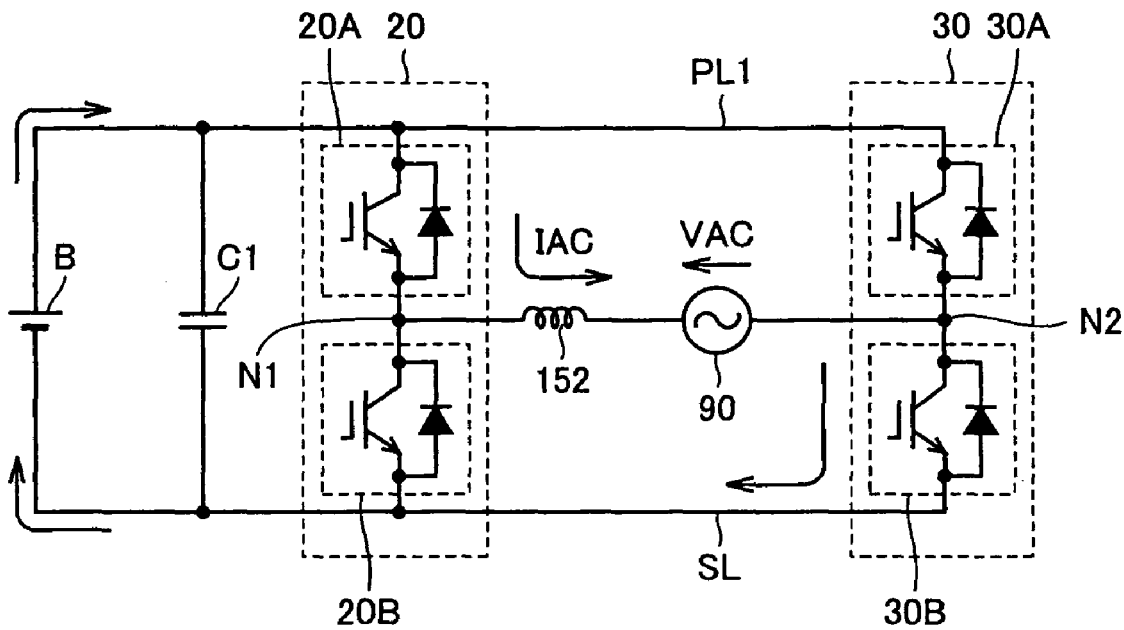
FIG. 13 is a first diagram representing current flow when power is fed to the commercial power supply from the power storage device.
Figure 14:
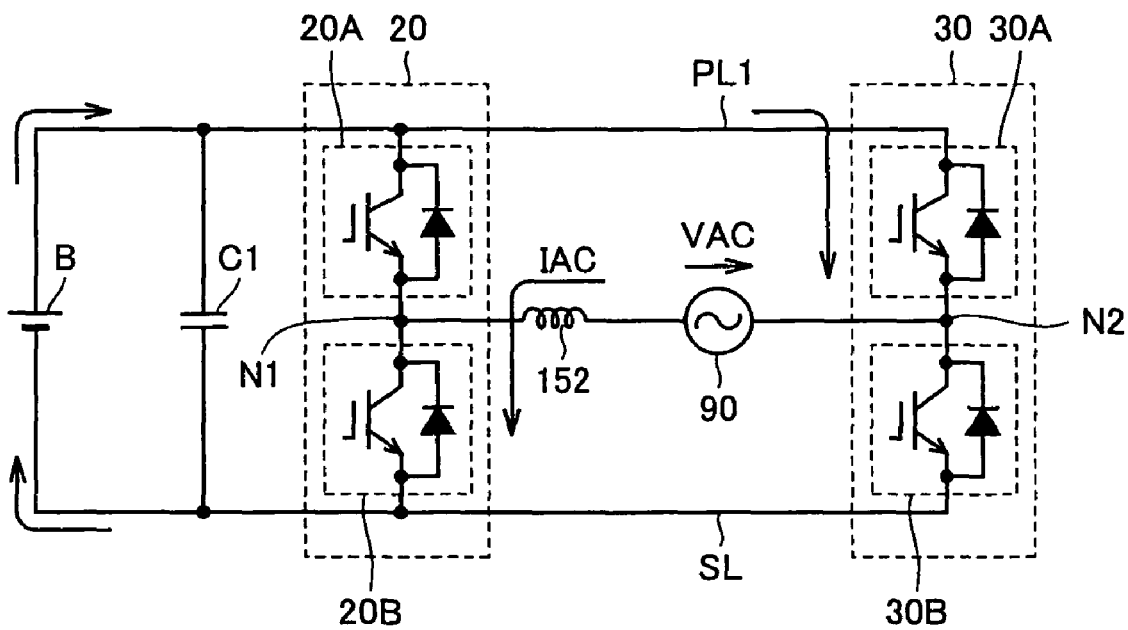
FIG. 14 is a second diagram representing current flow when power is fed to the commercial power supply from the power storage device.

FIGS. 13 and 14 show the current flow at the time of power feed from power storage device B to commercial power supply 90. FIG. 13 shows current flow in the first quadrant shown in FIG. 8. Referring to FIG. 13, in the first quadrant, upper arm 30A of inverter 30 is off and lower arm 30B is on. PWM operation of inverter 20 is performed based on the zero-phase command voltage E0, and current flows from power storage device B through upper arm 20A of inverter 20 to commercial power supply 90.

FIG. 14 shows the current flow in the third quadrant of FIG. 8. Referring to FIG. 14, in the third quadrant, upper arm 30A of inverter 30 is on, and lower arm 30B is off. PWM operation of inverter 20 is performed based on the zero-phase command voltage E0, and current flows from power storage device B through upper arm 30A of inverter 30 to commercial power supply 90.

Though not specifically shown, PWM operation of inverter 30 based on the zero-phase command voltage E0 can also similarly be described.

The inverter that performs the PWM operation based on the zero-phase command voltage E0 may be periodically switched between inverters 20 and 30. By way of example, these may be switched based on the period of voltage VAC (for example, at every few periods). Thus, load concentration of either one of the inverters can be avoided.

As described above, in Embodiment 1, command current generating unit 62 generates a command current IR that is free of harmonics component or fluctuation component of commercial power supply 90 and that can charge or feed power with power factor of 1 with respect to commercial power supply 90. Inverter control unit 64 controls current based on the command current IR and, hence, generation of ineffective power or harmonics current derived from harmonics component or fluctuation component can be curbed.

Therefore, Embodiment 1 enables efficient charging of power storage device B from commercial power supply 90 and efficient power feed from power storage device B to commercial power supply 90. Further, even when the voltage level of commercial power supply 90 is switched, a constant electric power corresponding to the charge/discharge power command value PR can be ensured. Specifically, though voltage level of commercial power supply 90 differs country by country, according to Embodiment 1, constant charging power and constant feeding power can be attained without necessitating change in system or setting. Further, the loss and generation of ineffective electric power due to harmonics and fluctuation component can be prevented, and therefore, a high efficiency and small size can be realized.

Further, inverter control unit 64 controls zero-phase voltage of inverter 20 based on command current IR, and hence, the control does not have any influence on the torque of motor generators MG1 and MG2. Therefore, according to Embodiment 1, power control of commercial power supply 90 is possible without interfering torque control of motor generators MG1 and MG2. Specifically, charging of power storage device B from commercial power supply 90 and power feed from power storage device B to commercial power supply 90 are possible while motor generators MG1 and MG2 are being driven.

Further, inverter control unit 64 controls the zero-phase voltage only of inverter 20 based on command current IR and, hence, switching loss can be reduced than when zero-phase voltages of both inverters 20 and 30 are controlled. Further, control logic can be simplified.

In Embodiment 1, power is exchanged with commercial power supply 90 using three phase coils 12 and 14 of motor generators MG1 and MG2 as well as inverters 20 and 30, and therefore, it is unnecessary to separately provide dedicated power converting device. Therefore, according to Embodiment 1, the number of additional components can be reduced. As a result, the invention contributes to lower cost, lighter weight and better mileage of hybrid vehicle 100.

Embodiment 2

In Embodiment 1, only the inverter 20 (or 30) is PWM-operated based on zero-phase command voltage E0, while in Embodiment 2, both inverters 20 and 30 are PWM-operated.

Embodiment 2 differs from Embodiment 1 in the configuration of inverter control unit, and except for this point, it is the same as Embodiment 1.

Figure 15:
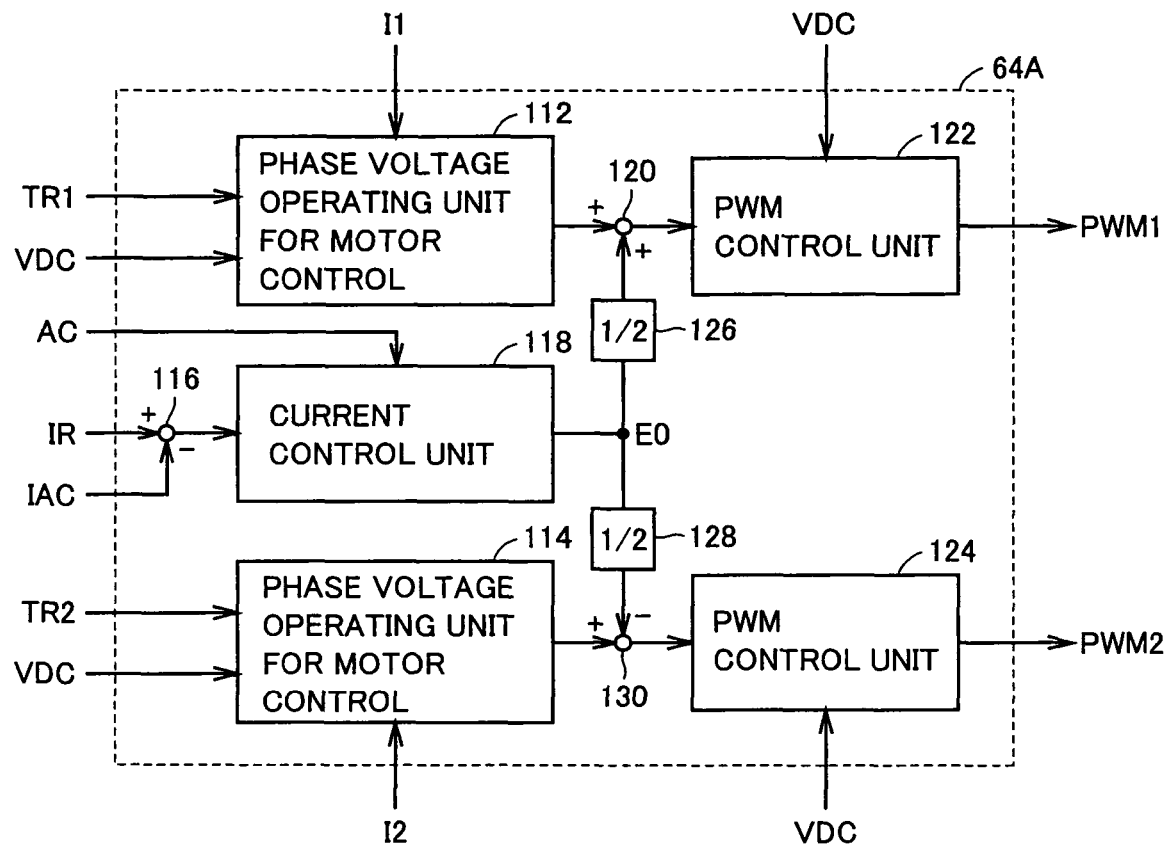
FIG. 15 is a detailed block diagram of the inverter control unit in accordance with Embodiment 2.

FIG. 15 is a detailed functional block diagram of the inverter control unit in accordance with Embodiment 2. Referring to FIG. 15, inverter control unit 64A corresponds to inverter control unit 64 of Embodiment 1 shown in FIG. 4, and it additionally includes multiplying units 126 and 128 and a subtracting unit 130.

Multiplying unit 126 multiplies zero-phase command voltage E0 from current control unit 118 by ½, and outputs the result of operation to adding unit 120. Adding unit 120 adds the output from multiplying unit 126 to the command voltage of each phase from phase voltage operating unit 112 for motor control, and outputs the result of operation to PWM control unit 122.

Multiplying unit 128 multiplies zero-phase command voltage E0 from current control unit 118 by ½, and outputs the result of operation to subtracting unit 130. Subtracting unit 130 subtracts the output of multiplying unit 128 from the command voltage of each phase from phase voltage operating unit 114 for motor control, and outputs the result of operation to PWM control unit 124. Then, based on the command voltage from subtracting unit 130, PWM control unit 124 generates the signal PWM2 for actually turning on/off each of the npn transistors Q21 to Q26 of inverter 30, and outputs the generated signal PWM2 to each of npn transistors Q21 to Q26 of inverter 30.

Specifically, in inverter control unit 64A, a command obtained by multiplying zero-phase command voltage E0 from current control unit 118 by ½ is applied to PWM control unit 122 of inverter 20, and a command corresponding to the command applied to PWM control unit 122 of inverter 20 with the sign inverted is applied to PWM control unit 124 of inverter 30. Specifically, when voltage difference is generated across neutral points N1 and N2 based on the zero-phase command voltage E0 from current control unit 118, voltage load is shared by inverters 20 and 30.

Figure 16:
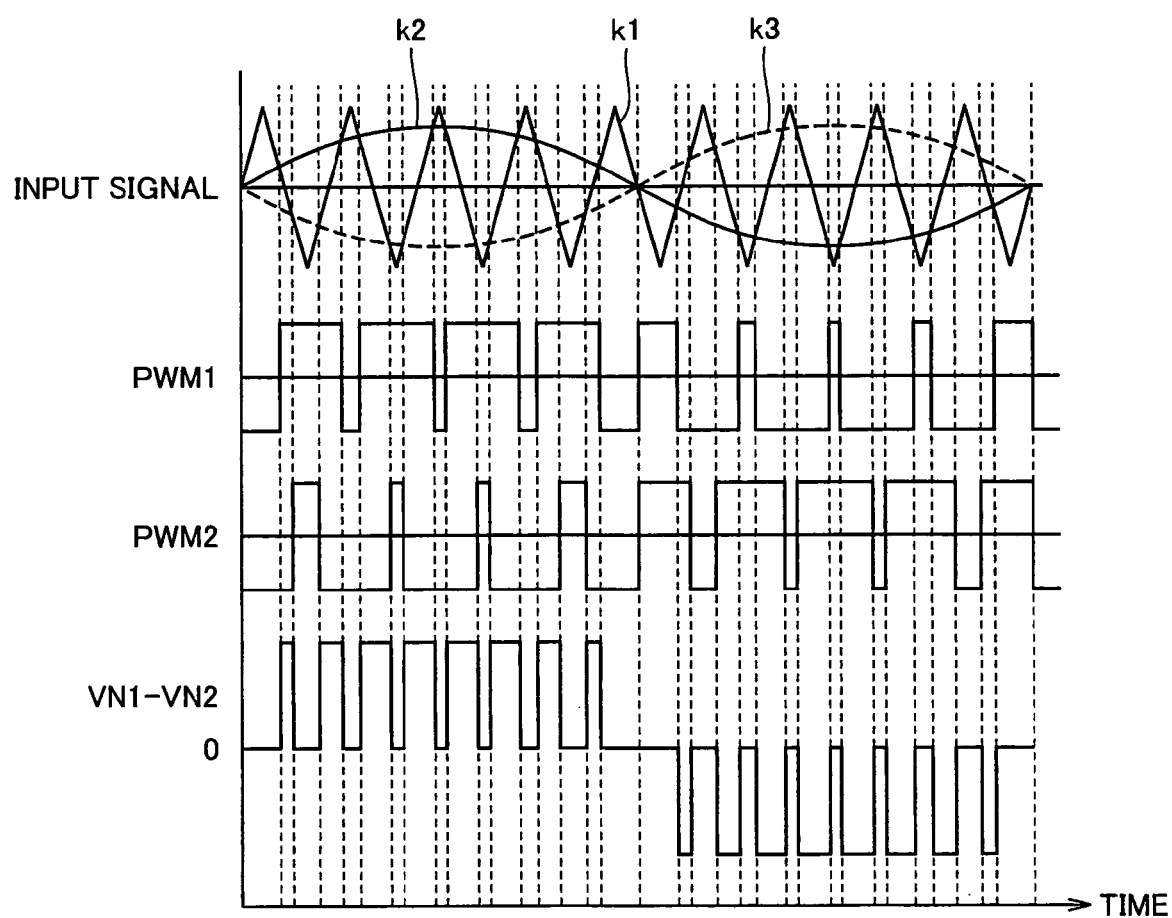
FIG. 16 is a diagram of waveforms of signals generated by the inverter control unit shown in FIG. 15 and voltage difference generated in response to the signals across neutral points.

FIG. 16 is a diagram of waveforms showing signals PWM1 and PWM2 generated by inverter control unit 64A shown in FIG. 15 and voltage difference generated across neutral points N1 and N2 in response to signals PWM1 and PWM2. FIG. 16 shows an example in which torque control of motor generators MG1 and MG2 is not performed.

Referring to FIG. 16, a triangular wave signal k1 is a carrier signal, having a preset carrier frequency. Amplitude of triangular signal k1 is determined in accordance with the voltage VDC from voltage sensor 72. A curve k2 is the zero-phase command voltage applied to PWM control unit 122 corresponding to inverter 20. A curve k3 in dotted line is the zero-phase command voltage applied to PWM control unit 124 corresponding to inverter 30. Curve k3 is sign-inverted version of curve k2, as described above.

PWM control unit 122 compares curve k2 with triangular wave signal k1, and generates a pulse-shaped PWM signal of which voltage value varies in accordance with the magnitude relation between curve k2 and triangular wave signal k1. PWM control unit 122 outputs the generated PWM signal as signal PWM1 to inverter 20, and the arms of respective phases of inverter 20 switch in synchronization with each other, in response to the signal PWM1.

PWM control unit 124 compares curve k3 with triangular wave signal k1, and generates a pulse-shaped PWM signal of which voltage value varies in accordance with the magnitude relation between curve k3 and triangular wave signal k1. PWM control unit 124 outputs the generated PWM signal as PWM2 to inverter 30, and the arms of respective phases of inverter 30 switch in synchronization with each other, in response to the signal PWM2.

Then, voltage difference between voltage VN1 at neutral point N1 and voltage VN2 at neutral point N2 changes as shown in the figure. The waveform of voltage difference between neutral points N1 and N2 has a frequency twice that of Embodiment 1 in which only one of the inverters 20 and 30 is PWM-operated (when only one of inverters 20 and 30 is PWM-operated, the voltage waveform of neutral point N1, N2 would be the same as signal PWM1 or PWM2).

In the foregoing, zero-phase command voltage E0 from current control unit 118 is multiplied by ½ in each of multiplying unit 126 and 128, so that voltage load for generating voltage difference between neutral points N1 and N2 is shared uniformly by inverters 20 and 30. Inverters 20 and 30 may bear different voltage loads. By way of example, zero-phase command voltage E0 from current control unit 118 may be multiplied by k ($0 \leq k \leq 1$) at multiplying unit 126 and it may be multiplied by (1−k) at multiplying unit 128, with the value k set to make smaller the share of that inverter which corresponds to the motor generator generating back electromotive voltage.

According to Embodiment 2, a waveform of a voltage across neutral points N1 and N2 becomes smooth and, therefore, harmonics current component in current IAC can be reduced. Further, ineffective power and noise can also be reduced, and the current input to/output from power storage device B is also smoothed.

[Modification 1 of Embodiment 2]

In the foregoing, zero-phase command voltages having the signs opposite to each other are applied to PWM control unit 122 corresponding to inverter 20 and PWM control unit 124 corresponding to inverter 30, respectively. It is also possible, however, to apply zero-phase command voltages of the same sign to PWM control units 122 and 124 and to use a signal obtained by inverting the sign of a carrier signal used for PWM control unit 122 as a carrier signal for PWM control unit 124.

Figure 17:
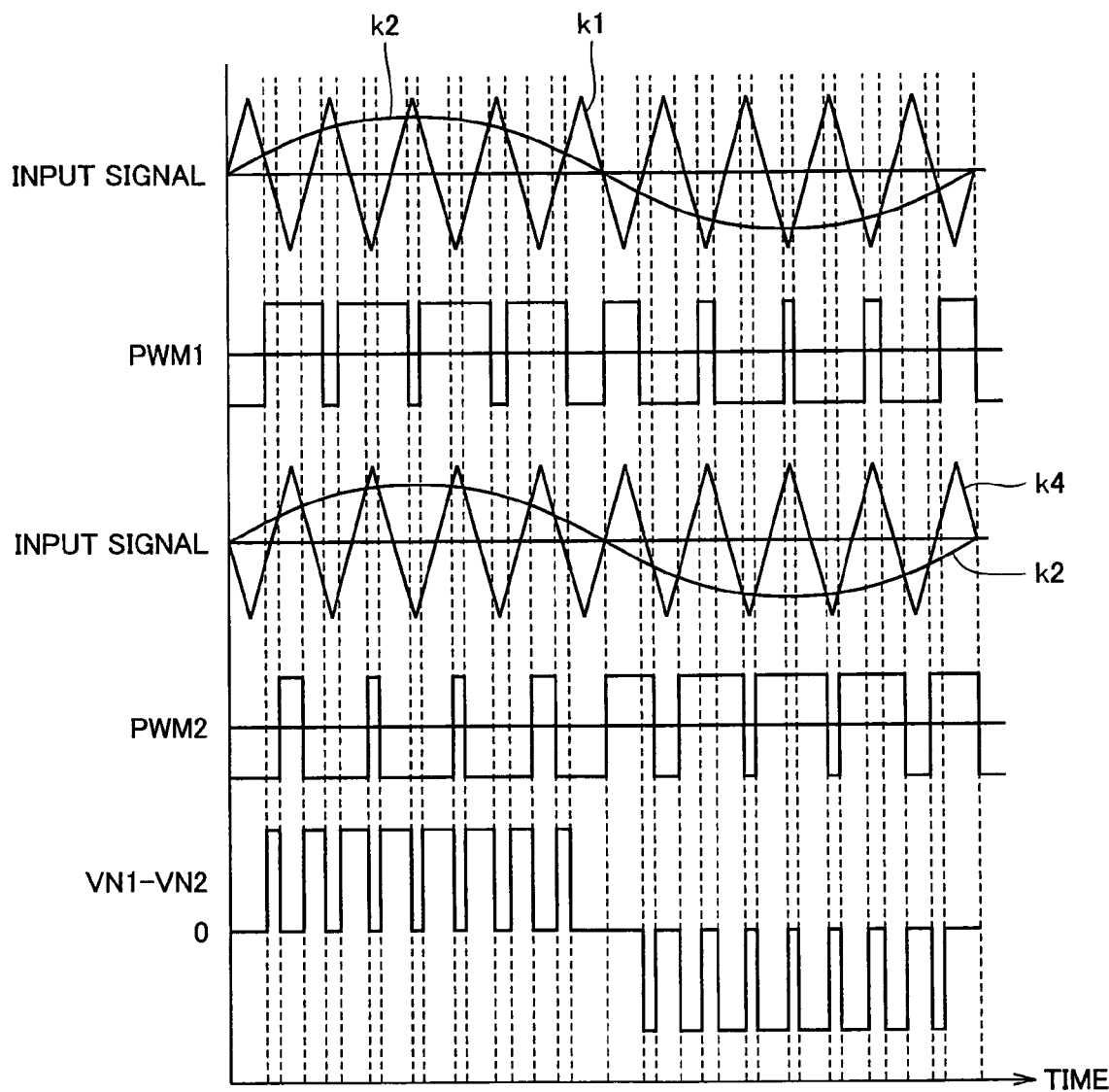
FIG. 17 is a diagram of waveforms of PWM signals generated in Modification 1 of Embodiment 2 and voltage difference generated in response to the PWM signals across neutral points.

FIG. 17 is a diagram of waveforms of signals PWM1 and PWM2 and the voltage difference generated across neutral points N1 and N2 in response to signals PWM1 and PWM2, in Modification 1 of Embodiment 2. Referring to FIG. 17, generation of signal PWM1 is the same as in Embodiment 2 shown in FIG. 16.

Triangular wave signal k4 represents a carrier signal used in PWM control unit 124 corresponding to inverter 30, which is the sign-inverted version of triangular wave signal k2 used in PWM control unit 122 corresponding to inverter 20.

PWM control unit 124 compares curve k2 with triangular wave signal k4, and generates a pulse-shaped PWM signal of which voltage value varies in accordance with the magnitude relation between curve k2 and triangular wave signal k4. PWM control unit 124 outputs the generated PWM signal as signal PWM2 to inverter 30.

In Modification 1 of Embodiment 2, the waveform of signal PWM2 is the same as signal PWM2 in accordance with Embodiment 2 shown in FIG. 16 and, therefore, the waveform of voltage difference between voltage VN1 at neutral point N1 and voltage VN2 at neutral point N2 is the same as that of Embodiment 2.

[Modification 2 of Embodiment 2]

In Modification 2 of Embodiment 2, one of inverters 20 and 30 is operated complementary to the other one. Specifically, in Modification 2, sign of signal PWM1 generated by using the zero-phase command voltage and the carrier signal is inverted, to generate signal PWM2.

Figure 18:
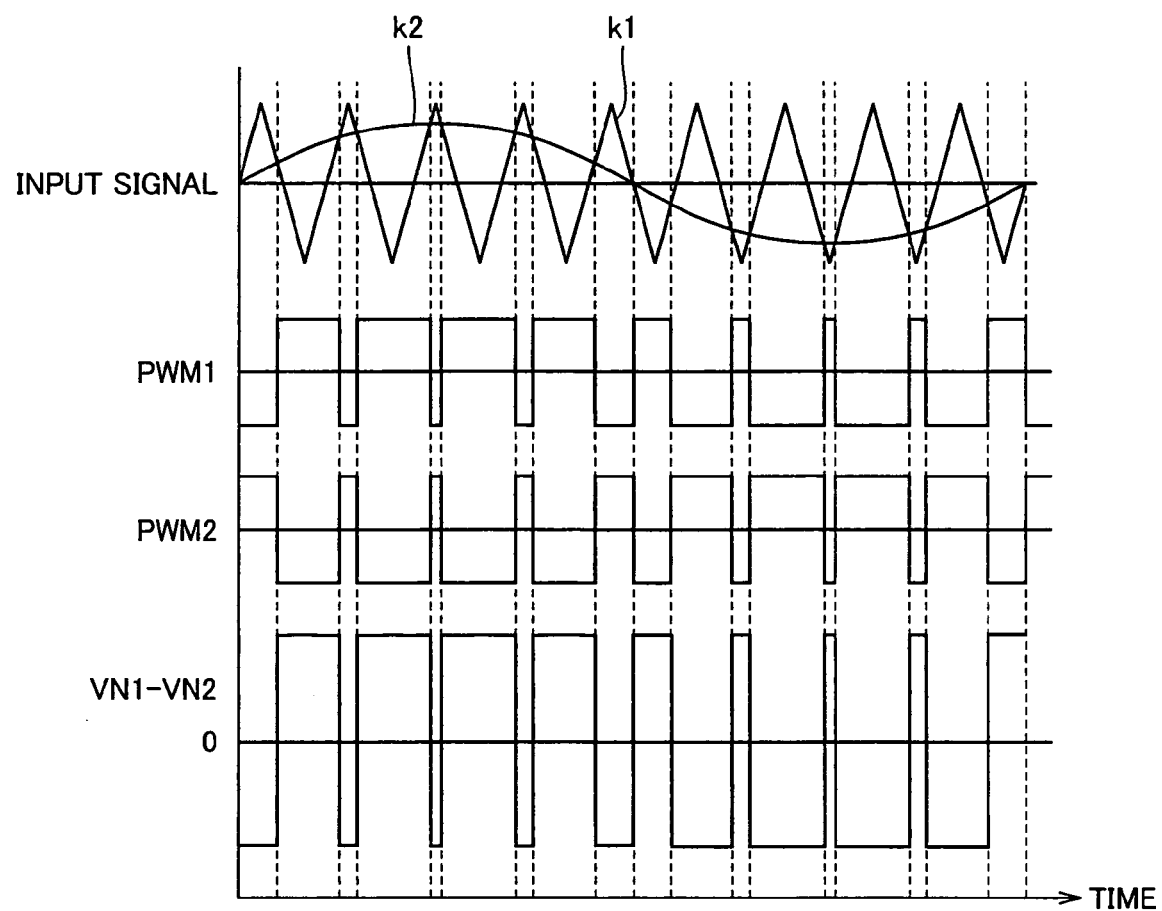
FIG. 18 is a diagram of waveforms of PWM signals generated in Modification 2 of Embodiment 2 and voltage difference generated in response to the PWM signals across neutral points.

FIG. 18 is a diagram of waveforms representing signals PWM1 and PWM2 and voltage difference generated across neutral points N1 and N2 in response to signals PWM1 and PWM2, in accordance with Modification 2 of Embodiment 2. Referring to FIG. 18, generation of signal PWM1 corresponding to inverter 20 is the same as in Embodiment 2 shown in FIG. 16. The signal PWM2 corresponding to inverter 30 is the sign-inverted version of signal PWM1 corresponding to inverter 20.

The signal PWM2 may be generated using the zero-phase command voltage and the carrier signal, and the signal PWM1 may be generated by inverting the sign of the generated signal PWM2.

In Modification 2 of Embodiment 2, the signal PWM2 is generated based on signal PWM1. Therefore, operation load can be reduced. Thus, according to Modification 2 of Embodiment 2, voltage load when the voltage difference is generated across neutral points N1 and N2 can be shared by inverters 20 and 30 while simpler control is realized.

Embodiment 3

In order for the amount of control to follow the target input without steady deviation, it is necessary that a closed loop of the control system contain a target input generation model (internal model principle). Therefore, in Embodiment 3, a configuration is disclosed in which, utilizing the fact that command current IR is a sinusoidal function, a model of command current IR (internal model) is included in the closed loop of current control system.

Embodiment 3 is different from Embodiment 1 or 2 in the configuration of current control unit in inverter control unit and, except for this point, the configuration is the same as that of Embodiment 1 or 2.

Figure 19:
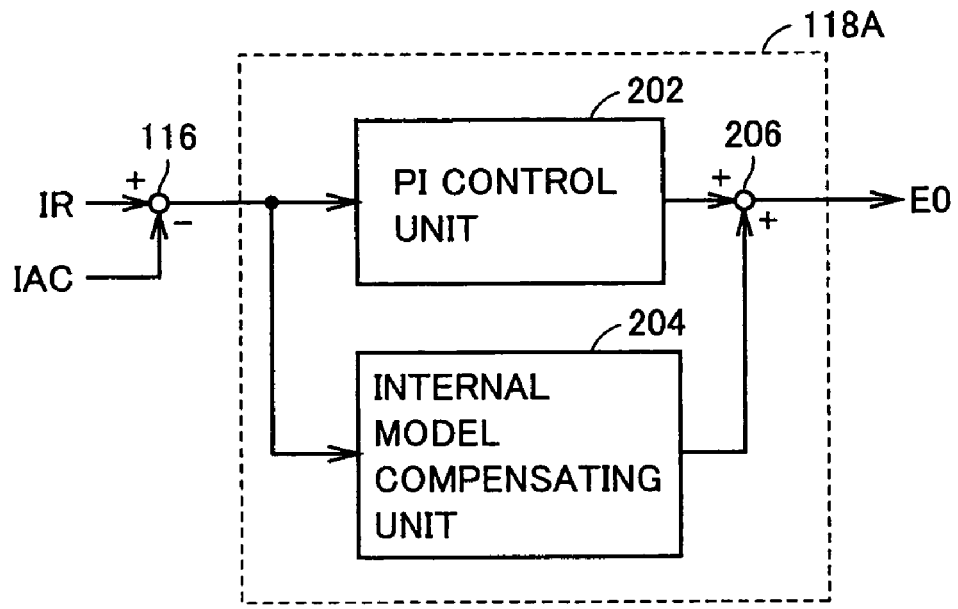
FIG. 19 is a control block diagram representing a configuration of a current control unit in accordance with Embodiment 3.

FIG. 19 is a control block diagram representing a configuration of the current control unit in accordance with Embodiment 3. Referring to FIG. 19, current control unit 118A includes a PI control unit 202, an internal model compensating unit 204 and an adding unit 206.

PI control unit 202 performs a proportional integral operation using as an input signal the deviation between command current IR from command current generating unit 62 and a current IAC from current sensor 86, and outputs the result of operation to adding unit 206.

Internal model compensating unit 204 includes a sinusoidal wave model, as the command current IR is a sinusoidal function. Internal model compensating unit 204 operates a compensation signal using the sinusoidal model, and outputs the calculated compensation signal to adding unit 206.

Adding unit 206 adds the compensation signal from internal model compensating unit 204 to the output signal from PI control unit 202, and outputs the result of operation as the zero-phase command voltage E0.

In current control unit 118, a sinusoidal wave model is included in the closed loop of the current control system as the command current IR is a sinusoidal function and, therefore, deviation between the command current IR and the current IAC can be removed without increasing to a certain degree the gain of PI control unit 202.

Figure 20:
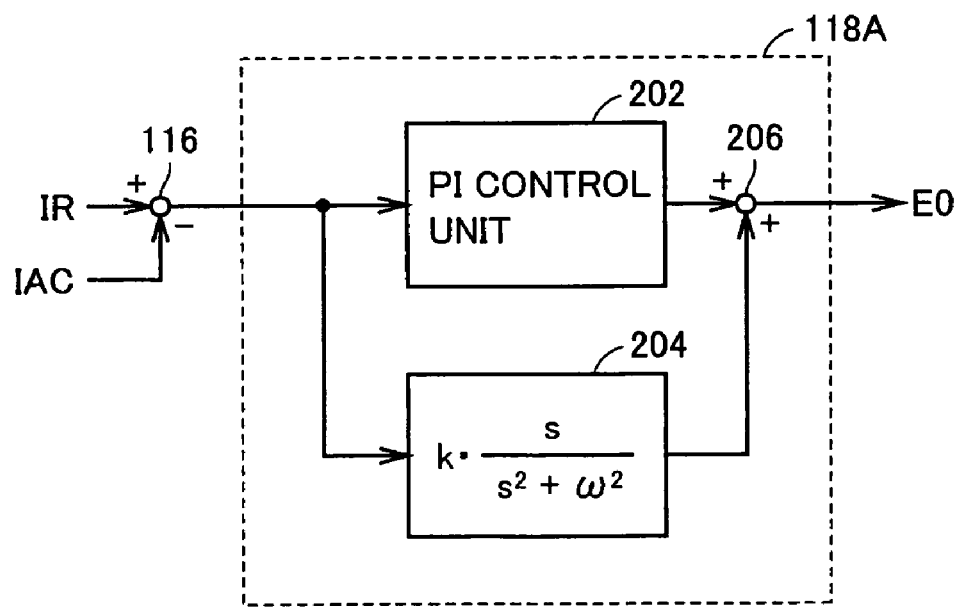
FIG. 20 is a control block diagram representing an exemplary configuration of an internal model compensating unit shown in FIG. 19.

FIG. 20 is a control block diagram showing an exemplary configuration of internal model compensating unit 204 shown in FIG. 19. Referring to FIG. 20, internal model compensating unit 204 includes a sinusoidal transmission function. Here, ω represents frequency of command current IR, and specifically, it is the same as the frequency of sinusoidal wave generated by sinusoidal wave generating unit 106 of command current generating unit 62 shown in FIG. 3, and k is a proportionality constant.

Figure 21:
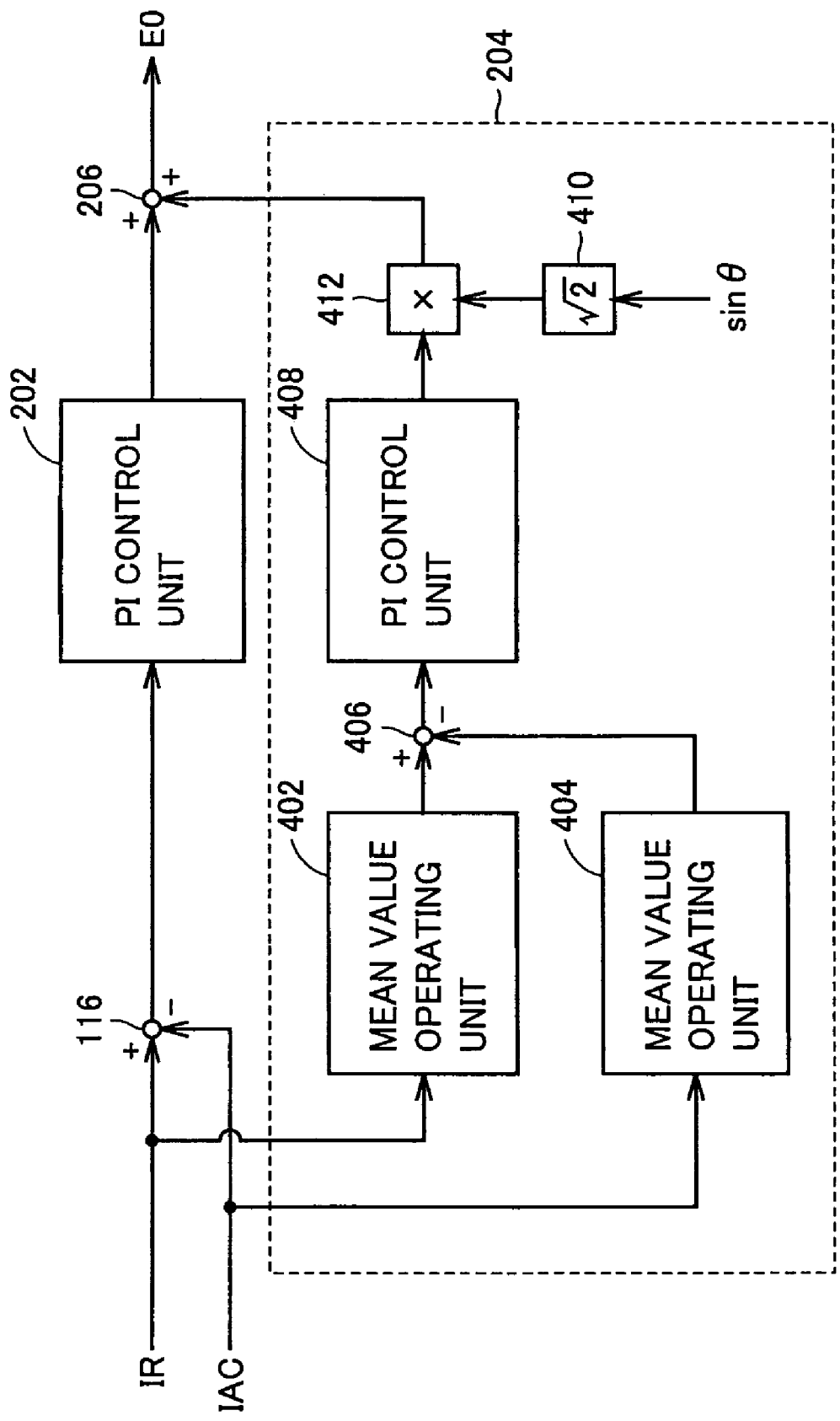
FIG. 21 is a control block diagram representing another exemplary configuration of an internal model compensating unit shown in FIG. 19.

FIG. 21 is a control block diagram representing another exemplary configuration of internal model compensating unit 204 shown in FIG. 19. Referring to FIG. 21, internal model compensating unit 204 includes mean value operating units 402 and 404, a subtracting unit 406, a PI control unit 408, and multiplying units 410 and 412.

Mean value operating unit 402 calculates mean value of the magnitude of command current IR. By way of example, mean value operating unit 402 operates mean value of half period (phase 0~π or π~2π) of the command current IR. Alternatively, mean value calculating unit 402 may integrate the absolute value of command current IR for 1 period or several periods, divide the integrated value by the number of samplings, and multiply the result by a conversion coefficient, to find the mean value of the magnitude of command current IR.

Mean value operating unit 404 calculates a mean value of the magnitude of current IAC from current sensor 86, in the similar manner as mean value operating unit 402. Subtracting unit 406 subtracts an output of mean value operating unit 404 from the output of mean value operating unit 402, and outputs the result of operation to PI control unit 408. PI control unit 408 performs a proportional integral operation using deviation between the output from mean value operating unit 402 and the output from mean value operating unit 404 as an input signal, and outputs the result of operation to multiplying unit 412.

Multiplying unit 410 multiplies a sinusoidal wave function of the same phase as the voltage of commercial power supply 90 by √2 and outputs the result to multiplying unit 412. Here, the sinusoidal function in phase with the voltage of commercial power supply 90 can be obtained from sinusoidal wave generating unit 106 of command current generating unit 62. Multiplying unit 412 multiplies the output from PI control unit 408 by the output of multiplying unit 410, and outputs the result of operation to adding unit 206.

In this manner, according to Embodiment 3, internal model compensating unit 204 includes a sinusoidal wave model in correspondence to the command current IR being a sinusoidal function and, therefore, current control without steady state deviation with respect to the command current IR becomes possible. Accordingly, the command current value can be better followed, improving stability, robustness and response of control. As a result, ineffective power and harmonic current can be reduced, realizing highly efficient and small size device.

Further, as the internal model compensating unit 204 is provided, control gain of PI control unit 202 can be lowered and, from this aspect also, stability of current control can be improved.

Embodiment 4

In the switching control of inverters, a dead time is generally provided to prevent simultaneous turning on of upper and lower arms. Because of the influence of dead time, waveform distortion occurs periodically near the zero-cross point of current IAC. Particularly in a high power inverter used for vehicles using electric power such as a hybrid vehicle, the dead time is often set large and, in such a case, there is considerable distortion. Embodiment 4 aims to reduce the waveform distortion periodically generated by the influence of the inverter dead time.

Figure 22:
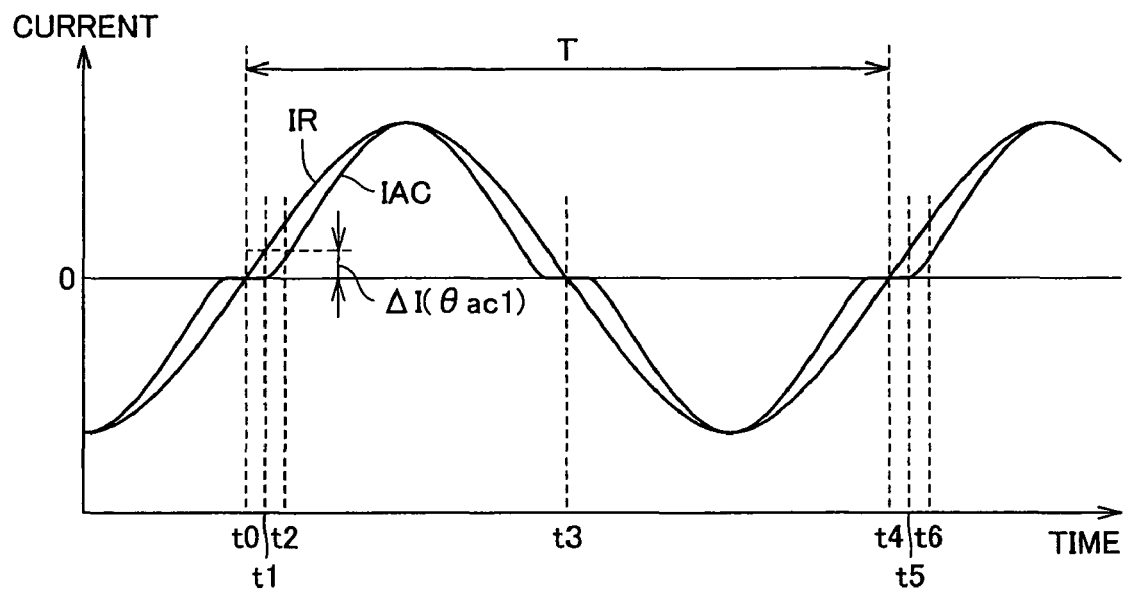
FIG. 22 shows waveform distortion periodically generated by the influence of an inverter dead time.

FIG. 22 shows waveform distortion periodically generated by the influence of dead time of inverters 20 and 30. Referring to FIG. 22, the ordinate and the abscissa represent current and time, respectively, and time change of command current IR and actual value of current IAC are plotted.

By the influence of dead time of inverters 20 and 30, waveform of current IAC is periodically distorted near the zero-cross points at times t0, t3 and t4, and the distortion becomes smaller away from the zero cross points. In general PI control, for example, when control gain is increased to curb distortion near the zero-cross point, overshoot or hunting occurs, possibly making control unstable. When the gain is lowered, on the other hand, the distortion near the zero-cross point cannot sufficiently be prevented.

Therefore, based on a deviation ΔI(θac1) between command current IR and current IAC at a time point t1 corresponding to a certain phase θac1, an amount of compensation is calculated, and the calculated amount of compensation is output at time point t5 corresponding to the phase θac1 after 1 period. Then, based on a deviation ΔI(θac2) (not shown) between command current IR and current IAC at a time point t2 corresponding to a certain phase θac2, an amount of compensation is calculated and the calculated amount of compensation is output at a time point t6 corresponding to the phase θac2 after 1 period. Such control is executed repeatedly phase after phase.

In other words, the amount of compensation is calculated based on the deviation between command current IR and current IAC of exactly one preceding phase. This operation is repeatedly executed, in accordance with the phase θac of command current IR. Specifically, the repeated control determines the amount of compensation at the same phase of the next period based on the deviation of the preceding period and, therefore, it is effective to prevent periodical disturbance generated near every zero-cross point because of the influence of inverter dead time.

Embodiment 4 is different from Embodiment 1 or 2 in the configuration of current control unit in the inverter control unit, and except for this point it is the same as Embodiment 1 or 2.

Figure 23:
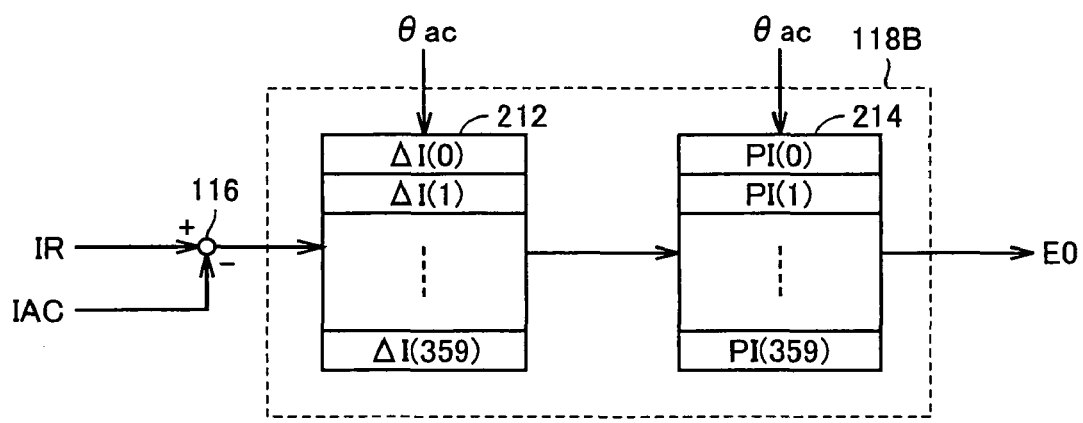
FIG. 23 is a control block diagram representing a configuration of the current control unit in accordance with Embodiment 4.

FIG. 23 is a control block diagram showing the configuration of current control unit in accordance with Embodiment 4. Referring to FIG. 23, current control unit 118B includes a current deviation storage table 212 and a gain table 214. Current deviation storage table 212 receives the deviation between command current IR and the current IAC from current sensor 86 from subtracting unit 116, and receives the phase θac of command current IR. As the phase θac, the phase detected at phase detecting unit 104 of command current generating unit 62 can be used.

Current deviation storage table 212 stores values ΔI(0)~ΔI(359) of every phase (for example, every degree) of deviation ΔI between command current IR and current IAC. After storing each of the deviations ΔI(0)~ΔI(359) of one period, current deviation storage table 212 reads the stored value in accordance with the phase θac and outputs to gain table 214.

Gain table 214 stores PI control gain of every phase (for example, every degree). In accordance with the phase θac, gain table 214 multiplies the output of current deviation storage table 212 by the corresponding PI control gain to calculate the amount of compensation and, outputs the result of operation as the zero phase command voltage E0.

In the foregoing, deviation ΔI between command current IR and current IAC is stored phase by phase. It may be also possible to store the command current IR phase by phase, and from the command current read after one period, the current IAC may be subtracted and the result may be output to gain table 214.

As described above, according to Embodiment 4, the distortion of current waveform caused by periodically generated disturbance including the influence of dead time of inverters 20 and 30 can be curbed. As a result, current controllability improves and generation of ineffective power or harmonic current can be prevented. Thus, efficient charging of power storage device B and efficient power feed to commercial power supply 90 can be realized.

Embodiment 5

In Embodiments 1 to 4 described above, the zero-phase command voltage E0 generated by the current control unit is applied to each phase of inverter 20 or/and 30. Specifically, in inverter 20 or/and 30, three-phase collective (synchronous) control of current IAC is performed by the inverter control unit. When impedances of respective phases of the inverter are ill-balanced, however, current flowing through coils of respective phases would be ill-balanced, possibly causing torque. Therefore, in Embodiment 5, current control unit is provided for each phase of inverters 20 and 30, and current control is performed independently for each phase, so that equal current flows through coils of respective phases.

Embodiment 5 differs from Embodiments 1 to 4 in the configuration of inverter control unit, and except for this point, it is the same as Embodiments 1 to 4.

Figure 24:
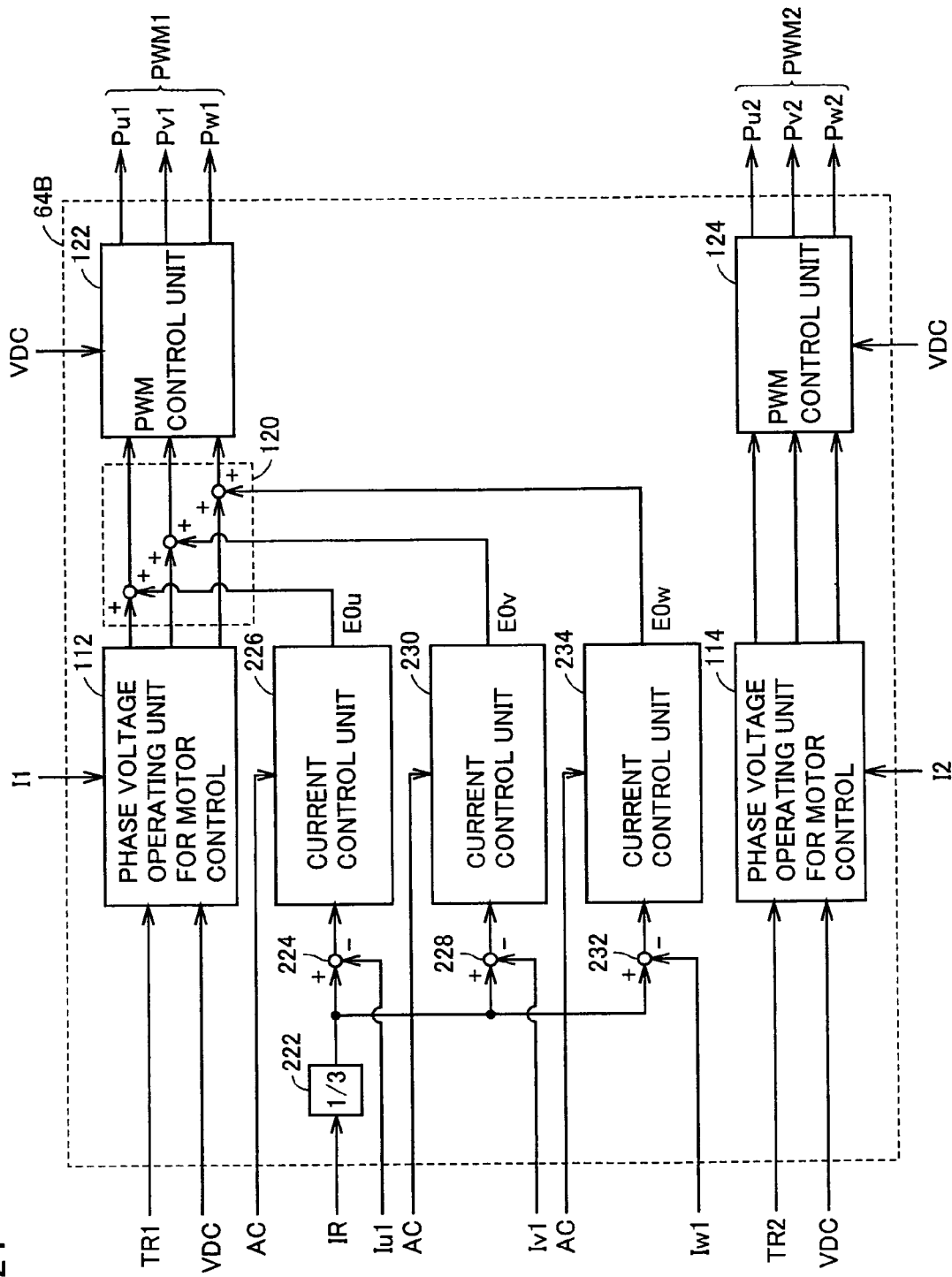
FIG. 24 is a detailed functional block diagram of the inverter control unit in accordance with Embodiment 5.

FIG. 24 is a detailed functional block diagram of inverter control unit in accordance with Embodiment 5. Referring to FIG. 24, an inverter control unit 64B corresponds to the configuration of inverter control unit 64 of Embodiment 1 shown in FIG. 4, and it includes, in place of subtracting unit 116 and current control unit 118, a multiplying unit 222, subtracting units 224, 228 and 232, and current control units 226, 230 and 234.

Multiplying unit 222 multiplies command current IR by ⅓ and outputs the result. Subtracting unit 224 subtracts U-phase current Iu1 from current sensor 82 from the output of multiplying unit 222, and outputs the result of operation to current control unit 226. Current control unit 226 generates, based on the output from subtracting unit 224, zero-phase command voltage E0u for the U-phase, to have the U-phase current Iu1 follow the command ⅓ times the command current IR, and outputs the generated zero-phase command voltage E0u for the U-phase to adding unit 120.

Subtracting unit 228 subtracts V-phase current Iv1 from current sensor 82 from the output of multiplying unit 222, and outputs the result of operation to current control unit 230. Current control unit 230 generates, based on the output from subtracting unit 228, zero-phase command voltage E0v for the V-phase, to have the V-phase current Iv1 follow the command ⅓ times the command current IR, and outputs the generated zero-phase command voltage E0v for the V-phase to adding unit 120.

Subtracting unit 232 subtracts W-phase current Iw1 from current sensor 82 from the output of multiplying unit 222, and outputs the result of operation to current control unit 234. Current control unit 234 generates, based on the output from subtracting unit 232, zero-phase command voltage E0w for the W-phase, to have the W-phase current Iw1 follow the command ⅓ times the command current IR, and outputs the generated zero-phase command voltage E0w to adding unit 120.

Current control units 226, 230 and 234 are activated when signal AC is active, and when the signal AC is inactive, the units output zero-phase command voltages E0u, E0v and E0w of 0, respectively.

Adding unit 120 adds command voltages of U, V and W phases from phase voltage operating unit 112 for motor control to zero-phase command voltages E0u, E0v and E0w, respectively, and outputs the result of operation to PWM control unit 122.

In inverter control unit 64B, for controlling current IAC, current control units 226, 230 and 234 are provided for U, V and W phases, respectively, and current is controlled such that each of U, V and W phase currents follow the command ⅓ times the command current IR. Therefore, in generating current IAC, current of the same phase and same amount is caused to flow through the coil of each phase, and hence, no torque is generated in motor generator MG1.

In the foregoing, current control units 226, 230 and 234 of respective phases may be implemented by general PI control or they may be formed similar to current control units 118A and 118B of Embodiments 3 and 4. Further, zero-phase command voltages E0u, E0v and E0w may be added to command voltages of respective phases from phase-voltage operating unit 114 for motor control.

As described above, according to Embodiment 5, in generating current IAC, current control is performed independently for each phase. Therefore, even when impedances of respective phases of motor generator MG1 are ill-balanced, current of the same phase and same amount is caused to flow through the coil of each phase. Therefore, according to Embodiment 5, generation of torque in motor generator MG1 can surly be prevented in generating the current IAC.

Embodiment 6

In Embodiments 1 to 5 described above, the voltage VDC is not controlled. When voltage VDC is controlled constant, it becomes possible to charge power storage device B with constant voltage, and hence, rapid charging or setting of current pattern in accordance with the state of power storage device B becomes possible. In Embodiment 6, a voltage control system for adjusting the voltage VDC to a target value is added.

Embodiment 6 is different from Embodiments 1 to 5 in the configuration of command current generating unit, and except for this point, it is the same as Embodiments 1 to 5.

Figure 25:
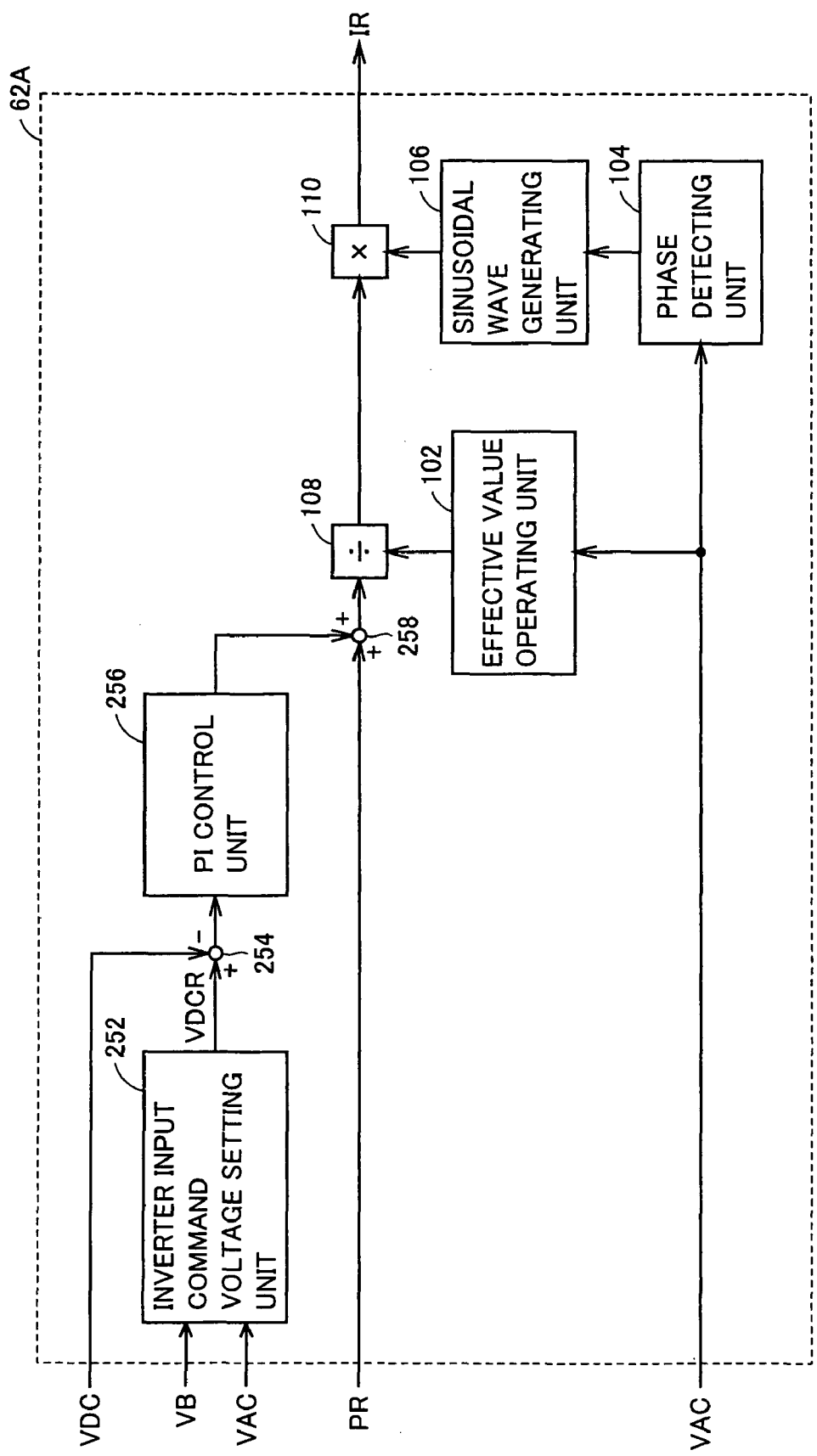
FIG. 25 is a detailed functional block diagram of the command current generating unit in accordance with Embodiment 6.

FIG. 25 is a detailed functional block diagram of the command current generating unit in accordance with Embodiment 6. Referring to FIG. 25, command current generating unit 62A corresponds to command current generating unit 62 of Embodiment 1 shown in FIG. 3, and it additionally includes an inverter input command voltage setting unit 252, a subtracting unit 254, a PI control unit 256 and an adding unit 258.

Inverter input command voltage setting unit 252 sets a target voltage VDCR of voltage VDC, based on the voltage VB of power storage device B and on the voltage VAC of commercial power supply 90. By way of example, inverter input command voltage setting unit 252 sets the target voltage VDCR to a value higher than the peak voltage of voltage VAC and higher than voltage VB. If the target voltage VDCR is too high, loss in inverters 20 and 30 increases and, therefore, the target voltage VDCR is set to an appropriate value in consideration of loss in inverters 20 and 30. The voltage VB of power storage device B is detected by a voltage sensor, not shown.

Subtracting unit 254 subtracts the voltage VDC from the target voltage VDCR set by inverter input command voltage setting unit 252, and outputs the result of operation to PI control unit 256. PI control unit 256 performs proportional integration operation using the output from subtracting unit 254 as an input signal, and outputs the result of operation to adding unit 258. Adding unit 258 adds the result of operation of PI control unit 256 to charge/discharge power command value PR and outputs the result of operation to dividing unit 108.

In command current generating unit 62A, a charge/discharge command power is corrected so that voltage VDC follow the target voltage VDCR, and based on the corrected charge/discharge command power, the command current IR is calculated. Response in the voltage control system improves when the control gain of PI control unit 256 is increased. When the response of the voltage control system is made too high, the charge/discharge command power fluctuates considerably and, as a result, it may cause generation of harmonics wave. Such possibility should also be taken into consideration.

As described above, in Embodiment 6, the voltage control system for controlling voltage VDC is added and, therefore, power storage device B can be charged with constant voltage. Therefore, according to Embodiment 6, control suitable for rapid charging can be realized. Further, it is possible to set a pattern of current IAC in accordance with the state of power storage device B or the voltage level of commercial power supply 90. Thus, efficiency of charging of power storage device B can be improved. Further, as the voltage VDC is controlled, controllability of inverters 20 and 30 improves, and as a result, loss, harmonics wave and ineffective current can be reduced. In addition, degradation of power storage device B can be curbed.

Embodiment 7

In Embodiment 7, a boost converter is provided between power storage device B and inverters 20 and 30. In consideration of control performance and conversion efficiency of inverters 20 and 30, the voltage VDC is adjusted to an appropriate level, by the boost converter.

Figure 26:
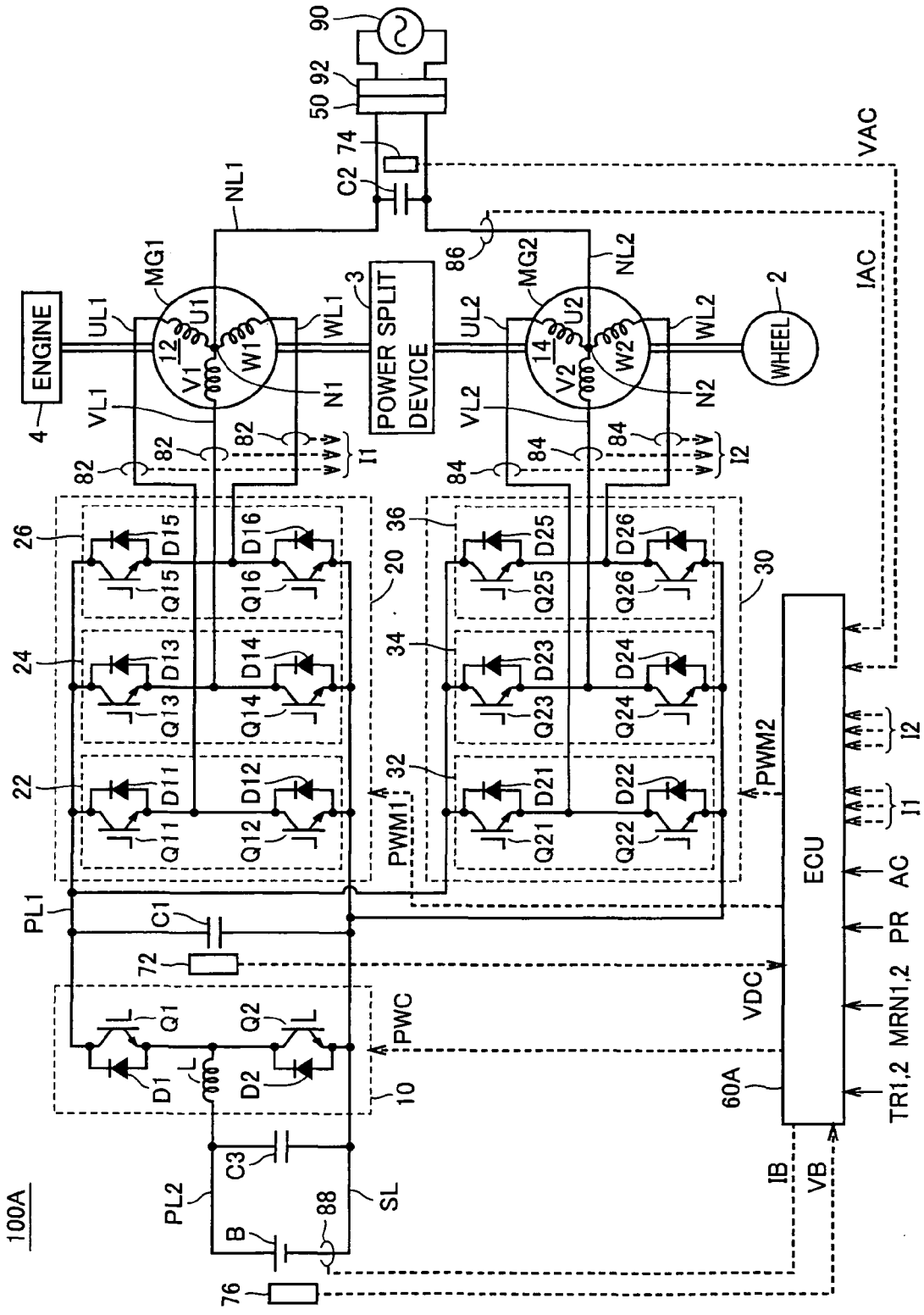
FIG. 26 is an overall block diagram of a hybrid vehicle shown as an example of the vehicle in accordance with Embodiment 7 of the present invention.

FIG. 26 is an overall block diagram of a hybrid vehicle shown as an example of the vehicle in accordance with Embodiment 7. Referring to FIG. 26, hybrid vehicle 100A has the configuration of hybrid vehicle 100 in accordance with Embodiment 1 shown in FIG. 1 and it additionally includes a boost converter 10, a power line PL2, a capacitor C3, a voltage sensor 76 and a current sensor 88 and, in place of ECU 60, it includes an ECU 60A.

Power storage device B has its positive electrode and negative electrode connected to power line PL2 and ground line SL, respectively. Capacitor C3 is connected between power line PL2 and ground line SL. Boost converter 10 includes a reactor L, npn transistors Q1 and Q2, and diodes D1 and D2. The npn transistors Q1 and Q2 are connected in series between power line PL1 and ground line SL. Between the collector and emitter of npn transistors Q1 and Q2, diodes D1 and D2 are connected, respectively, to cause a current to flow from the emitter side to the collector side. Reactor L has one end connected to a node between npn transistors Q1 and Q2, and the other end connected to power line PL2.

Based on a signal PWC from ECU 60A, boost converter 10 boosts a DC voltage received from power storage device B using reactor L, and outputs the boosted voltage to capacitor C1. Specifically, boost converter 10 boosts the DC voltage from power storage device B by accumulating the current that flows in response to the switching operation of npn transistor Q2 as magnetic field energy in reactor L, based on the signal PWC from ECU 60A. Further, boost converter 10 outputs the boosted voltage to power line PL1 through diode D1, in synchronization with off timing of npn transistor Q2. Further, based on the signal PWC from ECU 60A, boost converter 10 lowers the DC voltage supplied from power line PL1 and outputs it to power line PL2, to charge power storage device B.

Capacitor C3 smoothes voltage fluctuation between power line PL2 and ground line SL. Voltage sensor 76 detects the voltage VB of power storage device B, and outputs the detected voltage VB to ECU 60A. Current sensor 88 detects the current IB input to/output from power storage device B, and outputs the detected current IB to ECU 60A.

Figure 27:
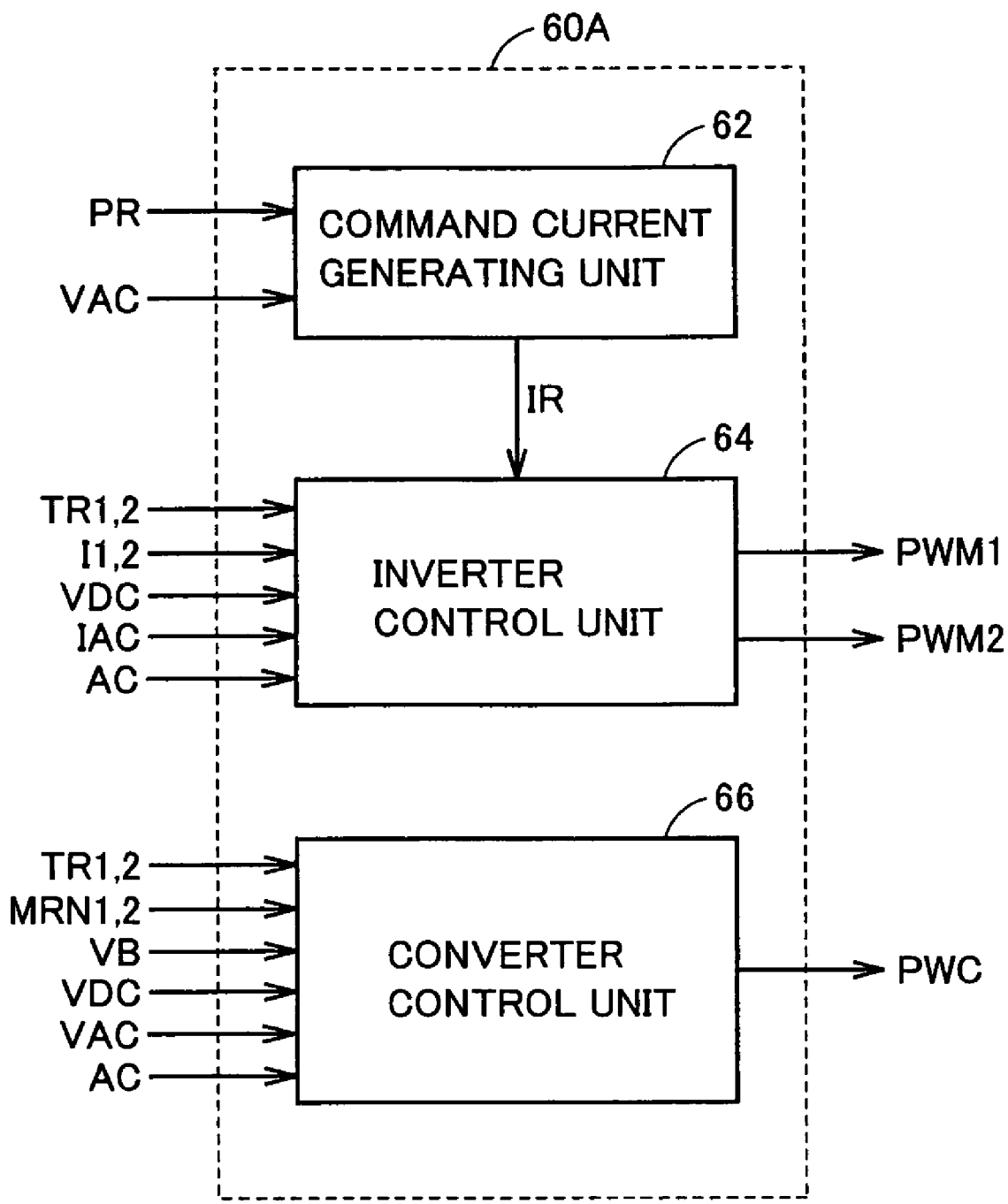
FIG. 27 is a functional block diagram of ECU shown in FIG. 26.

FIG. 27 is a functional block diagram of ECU 60A shown in FIG. 26. Referring to FIG. 27, ECU 60A has the configuration of ECU 60 shown in FIG. 2, and it additionally includes a converter control unit 66. Based on torque control values TR1 and TR2 and motor rotation numbers MRN1 and MRN2 of motor generators MG1 and MG2 received from vehicle ECU, voltage VB from voltage sensor 76, voltage VDC from voltage sensor 72, voltage VAC from voltage sensor 74 and on signal AC, converter control unit 66 generates the signal PWC for turning on/off the npn transistors Q1 and Q2 of boost converter 10, and outputs the generated signal PWC to boost converter 10.

Figure 28:
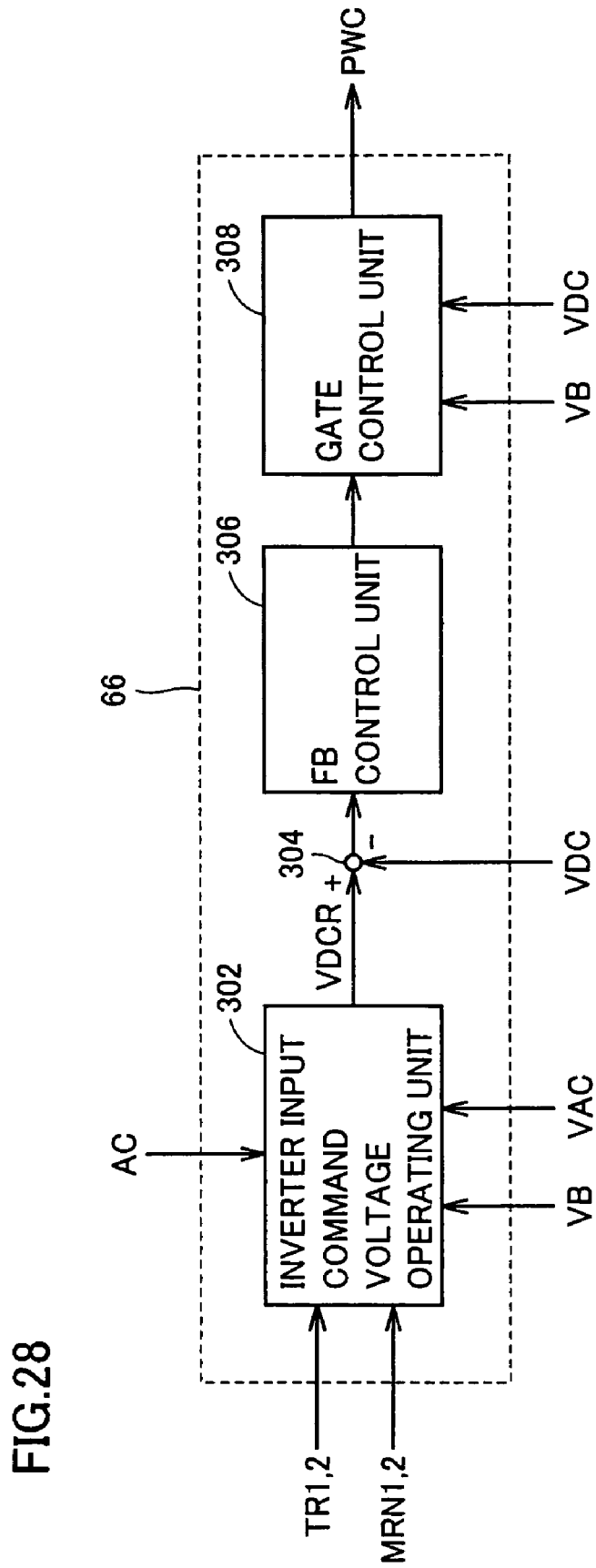
FIG. 28 is a detailed functional block diagram of the converter control unit shown in FIG. 27.

FIG. 28 is a detailed functional block diagram of converter control unit 66 shown in FIG. 27. Referring to FIG. 28, converter control unit 66 includes an inverter input command voltage operating unit 302, a subtracting unit 304, an FB control unit 306, and a gate control unit 308.

Inverter input command voltage operating unit 302 operates, when the signal AC is inactive, the optimal (target) value VDCR of inverter input voltage based on torque control values TR1 and TR2 and motor rotation numbers MRN1 and MRN2, and outputs the operated command voltage VDCR to subtracting unit 304.

Further, inverter input command voltage operating unit 302 sets, when the signal AC is active, the command voltage VDCR based on the voltage VB of power storage device B and the voltage VAC of commercial power supply 90. By way of example, inverter input command voltage operating unit 302 sets the target voltage VDCR to a value higher than the peak of voltage VAC and higher than voltage VB, as does inverter input command voltage setting unit 252 of Embodiment 6.

Subtracting unit 304 subtracts the voltage VDC from command voltage VDCR output from inverter input command voltage operating unit 302, and outputs the result of operation to FB control unit 306. FB control unit 306 performs a feedback operation (such as proportional integral operation) for adjusting the voltage VDC to command voltage VDCR, and outputs the result of operation to gate control unit 308.

Gate control unit 308 operates a duty ratio for adjusting the voltage VDC to command voltage VDCR based on voltages VB and VDC. Then, gate control unit 308 generates the PWM signal for turning on/off npn transistors Q1 and Q2 of boost converter 10 based on the operated duty ratio, and outputs the generated PWM signal as the signal PWC to npn transistors Q1 and Q2 of boost converter 10.

By increasing on-duty of npn transistor Q2 of the lower arm of boost inverter 10, power accumulation in reactor L increases, and hence, voltage VDC can be made higher. By increasing on-duly of npn transistor Q1 of the upper arm, the voltage VDC lowers. Therefore, by controlling duty ratio of npn transistors Q1 and Q2, the voltage VDC can be adjusted to an arbitrary value not lower than the voltage VB.

As described above, according to Embodiment 7, boost converter 10 is provided and the voltage VDC is adjusted to the target voltage VDCR. Therefore, controllability and conversion efficiency of inverters 20 and 30 can be optimized. As a result, more efficient charging of power storage device B from commercial power supply 90 and more efficient power feed from power storage device B to commercial power supply 90 become possible.

Embodiment 7 attains effects similar to those of Embodiment 6 and, in addition, higher degree of freedom can be attained than in Embodiment 6, since current control system for controlling current IAC and voltage control system for controlling voltage VDC are provided separately.

Embodiment 8

When current IB input to/output from power storage device B fluctuates, loss in the resistance component of power storage device B and resistance component of reactor L of boost converter 10 increases, and charge/discharge efficiency of power storage device B lowers. Therefore, in Embodiment 8, a current control system capable of reducing fluctuation (pulsing motion) of current IB is added to the configuration of Embodiment 7.

Embodiment 8 is different from Embodiment 7 in the configuration of converter control unit and, except for this point, it is the same as Embodiment 7.

Figure 29:
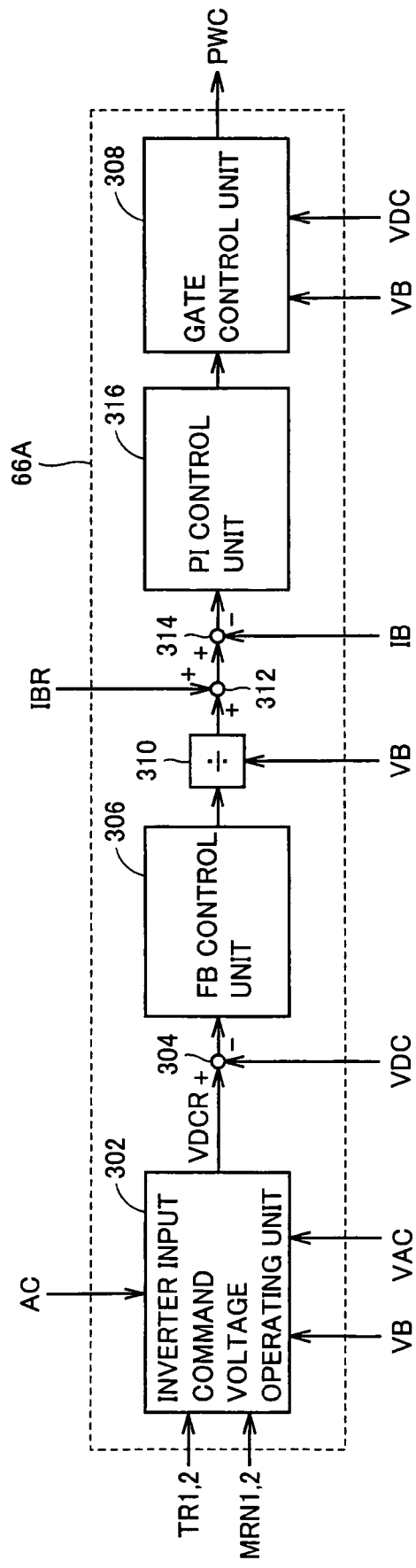
FIG. 29 is a detailed functional block diagram of the converter control unit in accordance with Embodiment 8.

FIG. 29 is a detailed functional block diagram of converter control unit in accordance with Embodiment 8. Referring to FIG. 29, converter control unit 66A has a configuration of converter control unit 66 in accordance with Embodiment 7 shown in FIG. 28, and it additionally includes a dividing unit 310, an adding unit 312, a subtracting unit 314 and a PI control unit 316.

Dividing unit 310 divides the output from FB control unit 306 by the voltage VB from voltage sensor 76. Adding unit 312 adds a command current IBR input to/output from power storage device B to the output of dividing unit 310. The command current IBR may be obtained by, for example, dividing the charge/discharge power command value PR by voltage VB.

Subtracting unit 314 subtracts the current IB from current sensor 88 from the output of adding unit 312 and outputs the result of operation to PI control unit 316. PI control unit 316 performs proportional integral operation using the output from subtracting unit 314 as an input signal, and outputs the result of operation to gate control unit 308.

In converter control unit 66A, PI control unit 316 controls current IB so that it comes closer to command current IBR. When the controllability of current IB is made too high (when control gain of PI control unit 316 is set too high), controllability of voltage VDC lowers. If capacitor C1 has sufficient capacity and voltage fluctuation of voltage VDC can be prevented to some extent by capacitor C1, higher controllability of current IB contributes to improved charge/discharge efficiency of power storage device B.

As described above, according to Embodiment 8, a current control system for controlling current IB to the target current is added to the converter control unit and, therefore, by appropriately setting controllability of voltage VDC and controllability of current IB, charge/discharge efficiency of power storage device B can further be improved. Further, reduced pulsing motion of current IB contributes to less degradation of power storage device B. In addition, loss and degradation of capacitor C1 can also be suppressed.

Embodiment 9

If a system main relay (not shown) provided between power storage device B and boost converter 10 should be turned off by some abnormality during an operation of boost converter 10, energy accumulated in reactor L of boost converter 10 would be discharged, causing excessive current to flow through the system main relay, and the system main relay would be welded. Further, excessive voltage may possibly be applied to boost converter 10, resulting in over-voltage breakdown of npn transistors Q1 and Q2. Therefore, in Embodiment 9, abnormality is detected based on the deviation between current IB and command current IBR, and if any abnormality is found, boost converter 10 is stopped before turning off the system main relay.

Embodiment 9 is different from Embodiment 8 in the configuration of converter control unit and, except for this point, it is the same as Embodiment 8.

Figure 30:
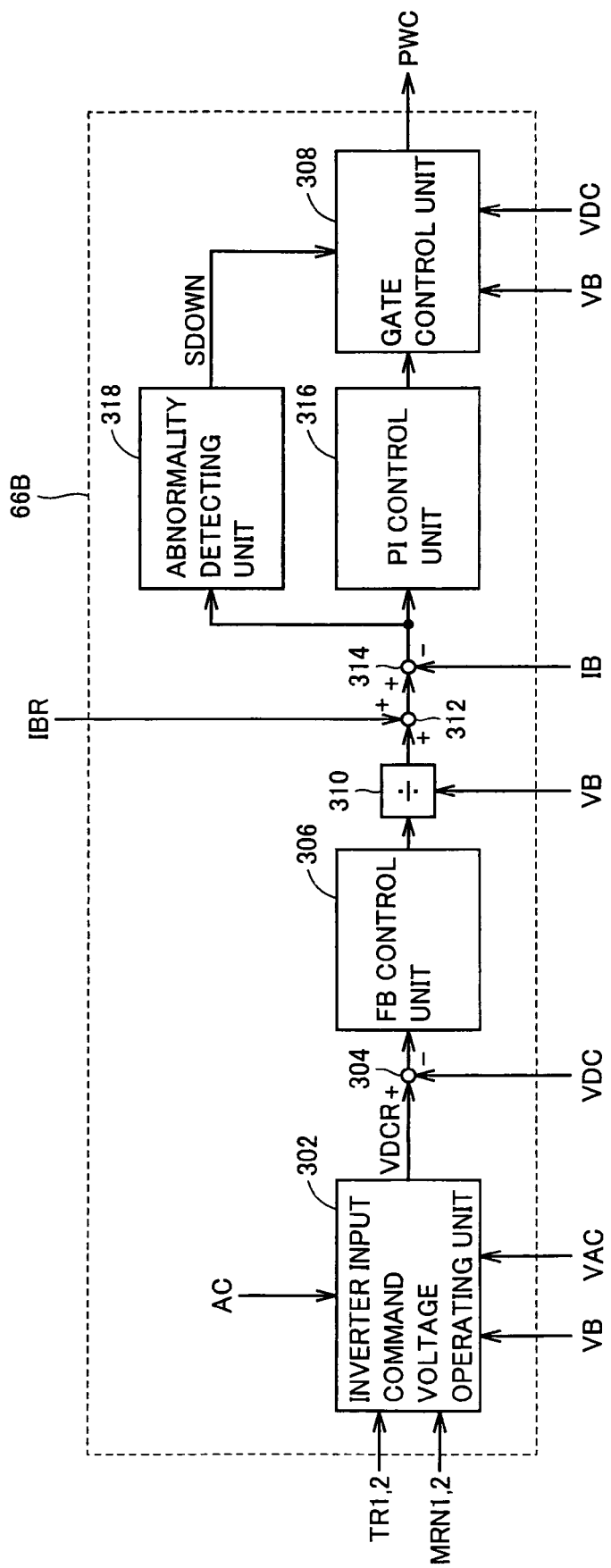
FIG. 30 is a detailed functional block diagram of the converter control unit in accordance with Embodiment 9.

FIG. 30 is a detailed functional block diagram of the converter control unit in accordance with Embodiment 9. Referring to FIG. 30, converter control unit 66B has the configuration of converter control unit 66A of Embodiment 8 shown in FIG. 29 and, it additionally includes an abnormality detecting unit 318.

Abnormality detecting unit 318 determines whether or not the output of subtracting unit 314, that is, deviation between command current and the current IB from current sensor 88, exceeded a preset defined value. If the deviation is determined to exceed the defined value, abnormality detecting unit 318 activates a shut-down signal SDOWN, and outputs the same to gate control unit 308.

When shut-down signal SDOWN from abnormality detecting unit 308 is activated, gate control unit 308 generates a signal PWC for turning off both npn transistors Q1 and Q2 of boost converter 10, and outputs the signal to boost converter 10.

In this manner, according to Embodiment 9, when the deviation between the command current and the actual current exceeds a defined value, the boost converter 10 is determined to be abnormal and boost converter 10 is stopped immediately. Therefore, welding of system main relay or over-voltage breakdown of boost converter 10 can be prevented. Further, as the failure detection of boost converter 10 is done by detecting actual current, stress-free device protection is possible.

Further, in each of the embodiments described above, motor generators MG1 and MG2 are three-phase AC rotating electric machines. The present invention, however, can also be readily expanded and applied to poly-phase AC rotating electric machines other than three-phase ones.

In each of the embodiments described above, the hybrid vehicle is assumed to be a series/parallel type one, in which power of engine 4 can be split and transmitted to the axle and motor generator MG1 by power split device 3. The present invention, however, is also applicable to a series type hybrid vehicle in which engine 4 is used only for driving motor generator MG1, and vehicle driving force is generated only by motor generator MG2 that uses electric power generated by motor generator MG1.

Further, in each of the embodiments, a hybrid vehicle has been described as an example of the vehicle in accordance with the present invention. The present invention is also applicable to an electric vehicle or a fuel cell vehicle, in which engine 4 is not mounted.

In the foregoing, motor generators MG1 and MG2 correspond to the "first AC rotating electric machine" and the "second AC rotating electric machine," and three-phase coils 12 and 14 correspond to the "first poly phase winding" and the "second poly phase winding" of the present invention. Further, inverters 20 and 30 correspond to the "first inverter" and the "second inverter" of the present invention, and neutral points N1 and N2 corresponds to the "first neutral point" and the "second neutral point" of the present invention. Further, power lines NL1 and NL2 correspond to the "pair of power lines" of the present invention, and voltage sensor 74 corresponds to the "first voltage detecting device" of the present invention.

Current sensor 86 corresponds to the "first current detecting device" of the present invention and current sensors 82 and 84 correspond to the "plurality of second current detecting devices" of the present invention. Further, each of the current control units 118, 118A, 118B corresponds to the "current control unit" of the present invention, and current control units 226, 230, 234 correspond to the "plurality of current control units" of the present invention. Further, PWM control units 122 and 124 correspond to the "driving signal generating unit" and current control unit 118B corresponds to the "repeat control unit" of the present invention.

Further, voltage sensor 72 corresponds to the "second voltage detecting device" of the present invention, and inverter input command voltage setting unit 252, subtracting unit 254 and PI control unit 256 form the "voltage control unit of command current generating unit" of the present invention. Further, current sensor 88 corresponds to the "third current detecting device" of the present invention, and inverter input command voltage operating unit 302, subtracting unit 304 and FB control unit 306 form the "voltage control unit of converter control unit" of the present invention. Further, adding unit 312, subtracting unit 314 and PI control unit 316 form the "current control unit of converter control unit."

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power controller capable of executing either one of charging of a power storage device mounted on a vehicle from an AC power supply outside of the vehicle and power feed from said power storage device to said AC power supply comprising:

a first AC rotating electric machine including a star-connected first poly-phase winding as a stator winding;

a second AC rotating electric machine including a star-connected second poly-phase winding as a stator winding;

a first inverter connected to said first poly-phase winding and performing power conversion between said first AC rotating electric machine and said power storage device;

a second inverter connected to said second poly-phase winding and performing power conversion between said second AC rotating electric machine and said power storage device;

a pair of power lines connected to a first neutral point of said first poly-phase winding and a second neutral point of said second poly-phase winding, and configured to allow exchange of electric power between said AC power supply and said first and second neutral points;

a first voltage detecting device detecting a voltage of said AC power supply;

a command current generating unit detecting an effective value and phase of said AC power supply based on a detected voltage value from said first voltage detecting device, and based on the detected effective value and the phase and on a charge/discharge power command value for said power storage device, generating a command value of a current caused to flow to said pair of power lines having its phase adjusted with respect to the voltage of said AC power supply; and an inverter control unit controlling zero-phase voltage of at least one of said first and second inverters, based on the command current value generated by said command current generating unit.

2. The power controller according to claim 1, wherein said command current generating unit generates a command current value of the same phase as the voltage of said AC power supply.

3. The power controller according to claim 1, wherein said command current generating unit includes an effective value operating unit operating an effective value of the voltage of said AC power supply based on said detected voltage value, a phase detecting unit detecting phase of the voltage of said AC power supply based on said detected voltage value, a sinusoidal wave generating unit generating a sinusoidal wave phase-adjusted with respect to the phase detected by said phase detecting unit, and an operating unit dividing said charge/discharge power command value by said effective value, and multiplying the result of operation by the sinusoidal wave from said sinusoidal wave generating unit to generate said command current value.

4. The power controller according to claim 3, wherein said sinusoidal wave generating unit generates a sinusoidal wave of the same phase as the phase detected by said phase detecting unit.

5. The power controller according to claim 1, wherein said inverter control unit controls zero-phase voltage of either one of said first and second inverters based on said command current value, and holds the zero-phase voltage of the other one of the inverters at a fixed value.

6. The power controller according to claim 5, wherein said inverter control unit turns off an upper arm and turns on a lower arm of arms of respective phases of the said other inverter, when potential of a neutral point corresponding to said one inverter is higher than potential of a neutral point corresponding to the said other inverter, and turns on said upper arm and turns off said lower arm, when the potential of the neutral point corresponding to said one inverter is lower than the potential of the neutral point corresponding to the said other inverter.

7. The power controller according to claim 6, wherein said inverter control unit periodically switches said first and second inverters as an inverter controlling said zero-phase voltage based on said command current value.

8. The power controller according to claim 5, wherein said inverter control unit turns off upper and lower arms of the arms of respective phases of the said other inverter, when said power storage device is charged from said AC power supply.

9. The power controller according to claim 1, wherein said inverter control unit controls the zero-phase voltage of said first and second inverters based on said command current value such that the zero-phase voltage of said second inverter attains to zero-phase voltage of said first inverter with its sign inverted.

10. The power controller according to claim 9, wherein said inverter control unit generates a first driving signal for controlling switching of said first inverter dependent on a relation of magnitude between a prescribed carrier wave and a first signal wave generated based on said command current value, and generates a second driving signal for controlling switching of said second inverter dependent on a relation of magnitude between said carrier wave and a second signal wave obtained by inverting sign of said first signal wave.

11. The power controller according to claim 9, wherein said inverter control unit generates a first driving signal for controlling switching of said first inverter dependent on a relation of magnitude between a prescribed first carrier wave and a signal wave generated based on said command current value, and generates a second driving signal for controlling switching of said second inverter dependent on a relation of magnitude between a second carrier wave obtained by inverting sign of said first carrier wave and said signal wave.

12. The power controller according to claim 9, wherein said inverter control unit generates a first driving signal for controlling switching of said first inverter dependent on a relation of magnitude between a prescribed carrier wave and a signal wave generated based on said command current value, and generates a second driving signal that changes complementary to said first driving signal, for controlling switching of said second inverter.

13. The power controller according to claim 1, further comprising a first current detecting device detecting a current flowing through said pair of power lines;
wherein said inverter control unit includes a current control unit generating a zero-phase command voltage of said first and second inverters based on a deviation between a detected current value from said first current detecting device and said command current value, and a driving signal generating unit generating a driving signal for driving said first and second inverters based on the generated zero-phase command voltage.

14. The power controller according to claim 1, further comprising a plurality of second current detecting devices for detecting current flowing through respective phases of each of said first and second AC rotating electric machines;
wherein said inverter control unit includes a plurality of current control units provided corresponding to respective phases of each of said first and second AC rotating electrical machines, generating a command voltage of the corresponding phase of the corresponding inverter, based on a deviation between a detected current value of the corresponding said second current detecting device and the command current value of each phase obtained by uniformly distributing said command current value to respective phases, and a driving signal generating unit generating a driving signal for driving said first and second inverters based on the generated command voltage of each phase.

15. The power controller according to claim 13, wherein said current control unit or each of said plurality of current control units includes an internal model compensating unit calculating a control compensation amount using a sinusoidal wave function corresponding to said command current value.

16. The power controller according to claim 15, wherein said internal model compensating unit includes a first mean value operating unit calculating a mean value of magnitude of said command current value or said command current value of each phase, a second mean value operating unit calculating a mean value of magnitude of said detected current value, and an operating unit multiplying a deviation between an output from said first mean value operating unit and an output from said second mean value operating unit by a gain, and further multiplying the result of operation by a sinusoidal function of the same phase as said AC power supply to provide said control compensation amount.

17. The power controller according to claim 13, wherein said current control unit or each of said plurality of current control units includes a repetition control unit for successively calculating, for each phase of said AC power supply, said zero-phase command voltage or said command voltage for each phase, based on said deviation of last period of said AC power supply.

18. The power controller according to claim 1, further comprising a second voltage detecting device detecting a DC voltage applied to said first and second inverters;
wherein said command current generating unit includes a voltage control unit correcting, based on a deviation between a detected voltage value from said second voltage detecting device and a target voltage of said DC voltage, said charge/discharge power command value such that said DC voltage is adjusted to said target value.

19. The power controller according to claim 1, further comprising:
    a boost converter provided between said power storage device and said first and second inverters;
    a second voltage detecting device detecting a DC voltage applied to said first and second inverters; and
    a converter control unit controlling said boost converter such that said DC voltage is adjusted to a target voltage, based on a detected voltage value from said second voltage detecting device.

20. The power controller according to claim 19, further comprising a third current detecting device detecting a current input to/output from said power storage device;
    wherein said converter control unit includes a voltage control unit configured to adjust said DC voltage to said target voltage, based on a detected voltage value from said second voltage detecting device; and
    a current control unit configured to adjust a current input to/output from said power storage device to a target current, based on a detected current value from said third current detecting device.

21. The power controller according to claim 20, wherein said converter control unit stops said boost converter when a deviation between said detected current value and said target current exceeds a threshold value.

22. A vehicle, comprising:
    a power storage device; and
    a power controller capable of executing either one of charging of said power storage device from an AC power supply outside of the vehicle and power feed from said power storage device to said AC power supply wherein said power controller includes a first AC rotating electric machine including a star-connected first poly-phase winding as a stator winding;
    a second AC rotating electric machine including a star-connected second poly-phase winding as a stator winding, a first inverter connected to said first poly-phase winding and performing power conversion between said first AC rotating electric machine and said power storage device;
    a second inverter connected to said second poly-phase winding and performing power conversion between said second AC rotating electric machine and said power storage device;
    a pair of power lines connected to a first neutral point of said first poly-phase winding; and
    a second neutral point of said second poly-phase winding, and configured to allow exchange of electric power between said AC power supply and said first and second neutral points;
    a first voltage detecting device detecting a voltage of said AC power supply;
    a command current generating unit detecting an effective value and phase of said AC power supply based on a detected voltage value from said first voltage detecting device, and based on the detected effective value and the phase and on a charge/discharge power command value for said power storage device, generating a command value of a current caused to flow to said pair of power lines having its phase adjusted with respect to the voltage of said AC power supply; and
    an inverter control unit controlling zero-phase voltage of at least one of said first and second inverters, based on the command current value generated by said command current generating unit;
    said vehicle further comprising a wheel receiving driving torque from at least one of said first and second AC rotating electric machines.

* * * * *